(12) United States Patent
Oshima et al.

(10) Patent No.: US 7,127,430 B2
(45) Date of Patent: *Oct. 24, 2006

(54) RECORDING MEDIUM, RECORDER, REPRODUCER, CRYPTOCOMMUNICATION SYSTEM AND PROGRAM LICENSE SYSTEM

(75) Inventors: Mitsuaki Oshima, Kyoto (JP); Yoshiho Gotoh, Osaka (JP); Shinichi Tanaka, Tuzuki-gun (JP); Kenji Koishi, Sanda (JP); Mitsurou Moriya, Ikoma (JP); Yoshinari Takemura, Settu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 144 days.

This patent is subject to a terminal disclaimer.

(21) Appl. No.: 10/418,088

(22) Filed: Apr. 18, 2003

(65) Prior Publication Data

US 2003/0177098 A1 Sep. 18, 2003

Related U.S. Application Data

(63) Continuation of application No. 09/475,228, filed on Dec. 30, 1999, now Pat. No. 6,611,820, which is a continuation of application No. 08/849,468, filed as application No. PCT/JP96/02924 on Oct. 8, 1996, now Pat. No. 6,081,785.

(30) Foreign Application Priority Data

| Oct. 9, 1995 | (JP) | ................................... 7-261247 |
| Jan. 23, 1996 | (JP) | ................................... 8-008910 |
| Aug. 9, 1996 | (JP) | ................................... 8-211304 |

(51) Int. Cl.
*G06Q 99/00* (2006.01)

(52) U.S. Cl. ...................................................... 705/56

(58) Field of Classification Search .................. 705/51, 705/52, 53, 54, 55, 56; 713/155; 380/281
See application file for complete search history.

(56) References Cited

U.S. PATENT DOCUMENTS

| 4,278,837 A | 7/1981 | Best |
| 4,465,901 A | 8/1984 | Best |
| 4,677,604 A | 6/1987 | Selby, III et al. |
| 4,757,534 A | 7/1988 | Matyas et al. |
| 4,866,769 A | 9/1989 | Karp ............................ 705/56 |
| 5,214,627 A | 5/1993 | Nakashima et al. |
| 5,418,713 A | 5/1995 | Allen |

(Continued)

FOREIGN PATENT DOCUMENTS

EP 0 302 710 * 8/1988

(Continued)

OTHER PUBLICATIONS

Eickmann, I; Utility gives Clarity (PC disc identification); Oct. 1989; Mikrocomputer Zeitschrift No. 10 p. 140-4; dialog copy 1 page.*

*Primary Examiner*—Thomas A. Dixon
(74) *Attorney, Agent, or Firm*—Steptoe & Johnson LLP

(57) ABSTRACT

The operating and other procedures of a disk or recording medium application system of the type for which a network is used are simplified. Disks or recording media have auxiliary data recording areas, where different IDs for individual disk, and/or cipher keys and/or decoding keys for ciphers are recorded in advance in a factory. By using the IDs to release the soft ciphers, and using the cipher keys when sending the ciphers, and using the decoding keys when receiving the ciphers, user authorization procedures are simplified.

4 Claims, 24 Drawing Sheets

U.S. PATENT DOCUMENTS

| | | | |
|---|---|---|---|
| 5,513,169 | A | 4/1996 | Fite et al. |
| 5,563,946 | A | 10/1996 | Cooper et al. |
| 5,629,980 | A | 5/1997 | Stefik et al. |
| 5,647,049 | A | 7/1997 | Odaka et al. |
| 5,745,568 | A | 4/1998 | O'Connor et al. |
| 5,761,301 | A | 6/1998 | Oshimal et al. |
| 5,807,640 | A | 9/1998 | Ueno et al. |
| 5,844,593 | A | 12/1998 | Proffit et al. |
| 5,881,038 | A | 3/1999 | Oshima et al. |
| 5,959,944 | A | 9/1999 | Dockes et al. |
| 6,052,465 | A | 4/2000 | Gotoh et al. |

FOREIGN PATENT DOCUMENTS

| | | |
|---|---|---|
| EP | 0 302 710 | 2/1989 |
| EP | 0 549 488 | 6/1993 |
| EP | 0 549 488 A1 | 6/1993 |
| EP | 0 565 281 | 10/1993 |
| EP | 0 565 281 A 2 | 10/1993 |
| EP | 0 741382 A | 8/1996 |
| EP | 0 741 382 A1 | 11/1996 |
| JP | 03250878 | 2/1990 |
| JP | 04103253 | 8/1990 |
| JP | 4-178967 | 6/1992 |
| JP | 04 178987 | 8/1992 |
| JP | 07-021697 | 1/1995 |
| JP | 07-085574 | 3/1995 |

\* cited by examiner

Fig. 2a BCA Recording with a Laser
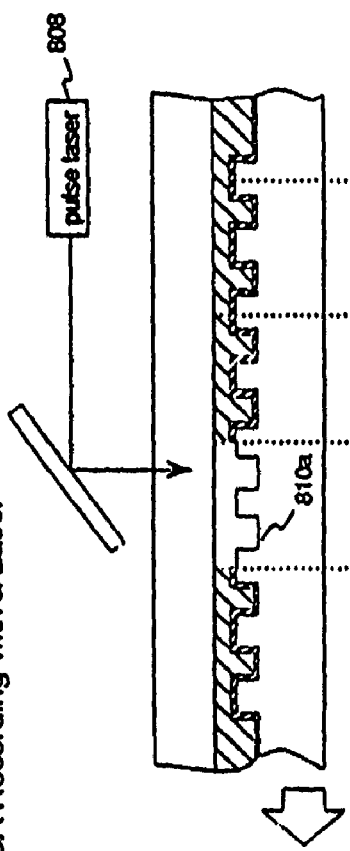
Fig. 2b After BCA Recording
Fig. 2c Reproduced Signal
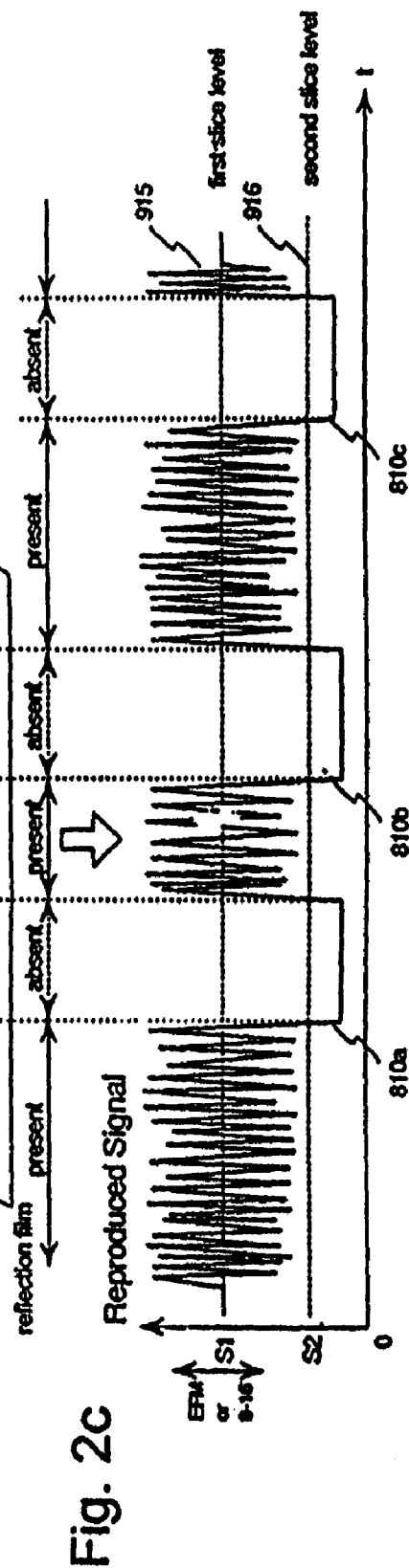

Fig. 3a  Top Plan
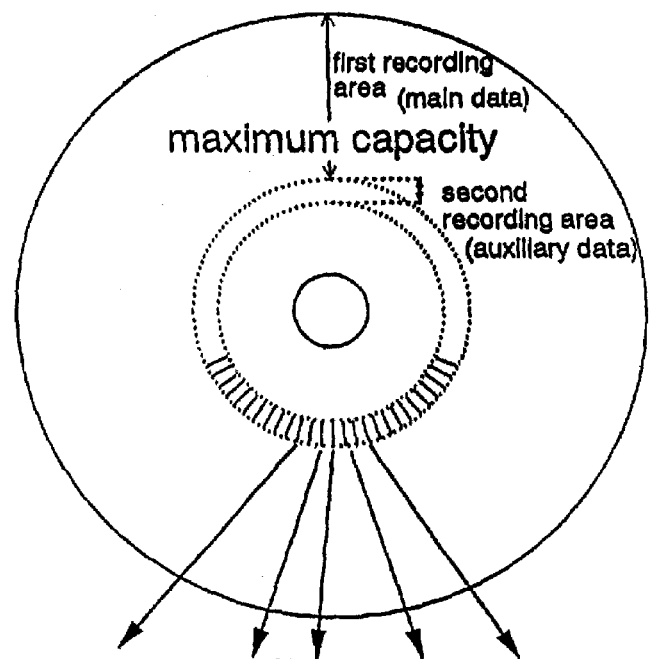
Fig. 3b  Bar Code PE Modulation
Recorded Signal
Fig. 3c  Recorded Signal
Fig. 3d  Recorded Data
Reproduced Signal
Fig. 3e  Reproduced Signal
Fig. 3f  Filtered
Fig. 3g  Reproduced Data
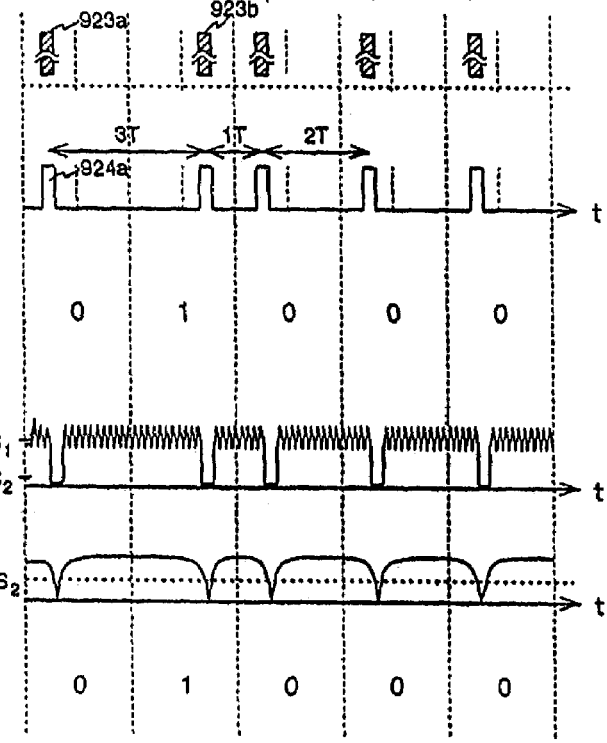

Fig. 5a Waveform of Reproduced Signal Not Yet Filtered
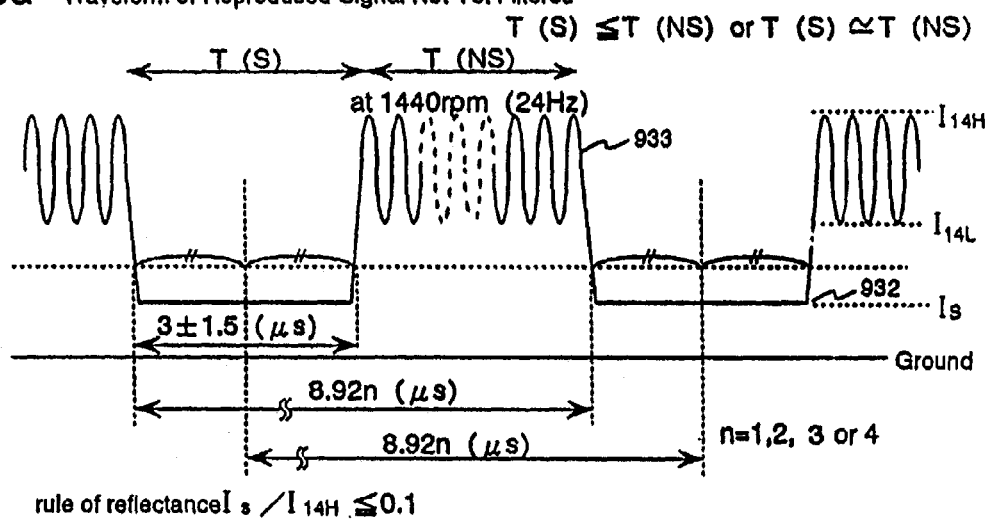
Fig. 5b Slit Dimension Accuracy (Precision) (at r=22.2mm)
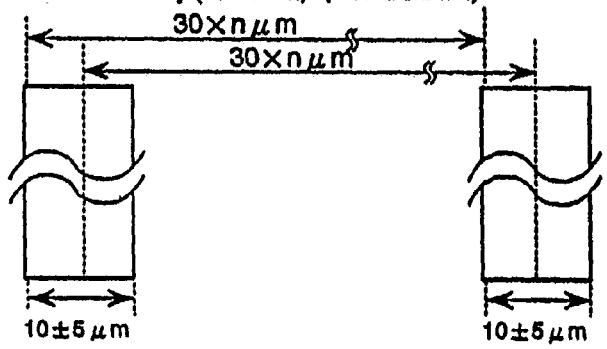

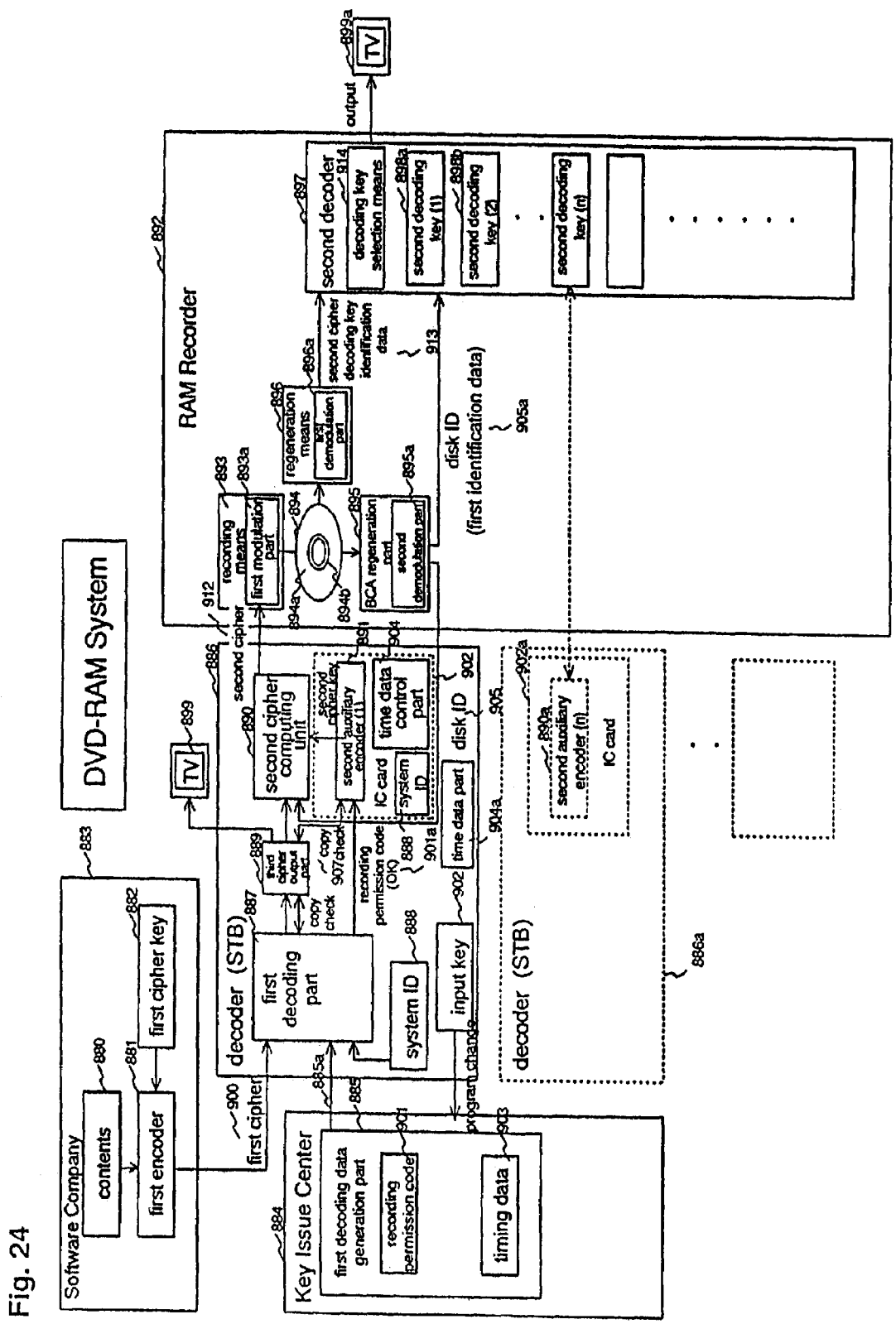

RECORDING MEDIUM, RECORDER, REPRODUCER, CRYPTOCOMMUNICATION SYSTEM AND PROGRAM LICENSE SYSTEM

This application is a Rule 1.53(b) continuation application of Ser. No. 09/475,228, filed Dec. 30, 1999, now U.S. Pat. No. 6,611,820; which is a continuation application of Ser. No. 08/849,468, filed Jun. 9, 1997, now U.S. Pat. No. 6,081,785; which is a National Stage of PCT/JP96/02924, filed Oct. 8, 1996.

TECHNICAL FIELD

The present invention relates to an optical disk, an optical disk system and a cryptocommunication method.

BACKGROUND

In recent years, with the increased use of networks such as the Internet and optical CD ROM disks, network soft key distribution for optical ROM disks has increased. Also, electronic commercial transactions have increased.

Soft key electronic distribution systems for CD-ROM media have been used. In conventional systems, it is known to give passwords and decipher the enciphered soft ciphers recorded on the CD-ROMs in advance. When CD-ROMs are used, however, it is not possible additionally to record on the disks, so that it is not possible to individually set IDs for respective disks. Therefore, one password would release the ciphers of all the disks manufactured from the same original disk. For this reason, when CD-ROMs are used, it is necessary to install the disks' IDs on the hard disks of personal computers, or mail to users IDs prepared centrally.

In electronic distribution systems with conventional optical disks and/or optical disk systems, there is a need to provide the disks and/or systems with ID and/or cipher keys. It is an object of the present invention to simply provide IDs and cipher keys for ROM disks in electronic distribution systems.

SUMMARY OF THE INVENTION

To achieve the objects of the present invention, the pit portions of optical disks are provided with an additional recording area or Burst Cutting Area (hereinafter abbreviated as BCA) overwritten with a bar code and, when the disks are manufactured, IDs differing for each disk and, according to the need, cipher keys for communication and decoding keys for decoding key cipher texts for communication, are recorded individually in the BCA areas. As a result, when the disks have been distributed to users, the user ID numbers, the cipher keys for transmission for communication, and the decoding keys for reception are distributed automatically to the users. It is therefore possible to omit some of the procedures that complicate conventional systems. Also, cryptocommunication and the identification of disks are made possible at the same time.

BRIEF DESCRIPTION OF THE DRAWINGS

FIGS. 2a–c are cross sections and results of trimming with a pulse laser according to an embodiment of the invention.

FIGS. 3a–g show the signal reproduction waveforms at a trimming portion according to an embodiment of the invention.

FIG. 5a shows the waveform of a reproduced signal at a BCA part according to the invention. FIG. 5b shows dimensional relationships of a BCA part according to the invention.

FIG. 24 is a block diagram of a method of recording and reproducing for recording limitation to one RAN disk with a BCA according to an embodiment of the invention.

Figure 1:
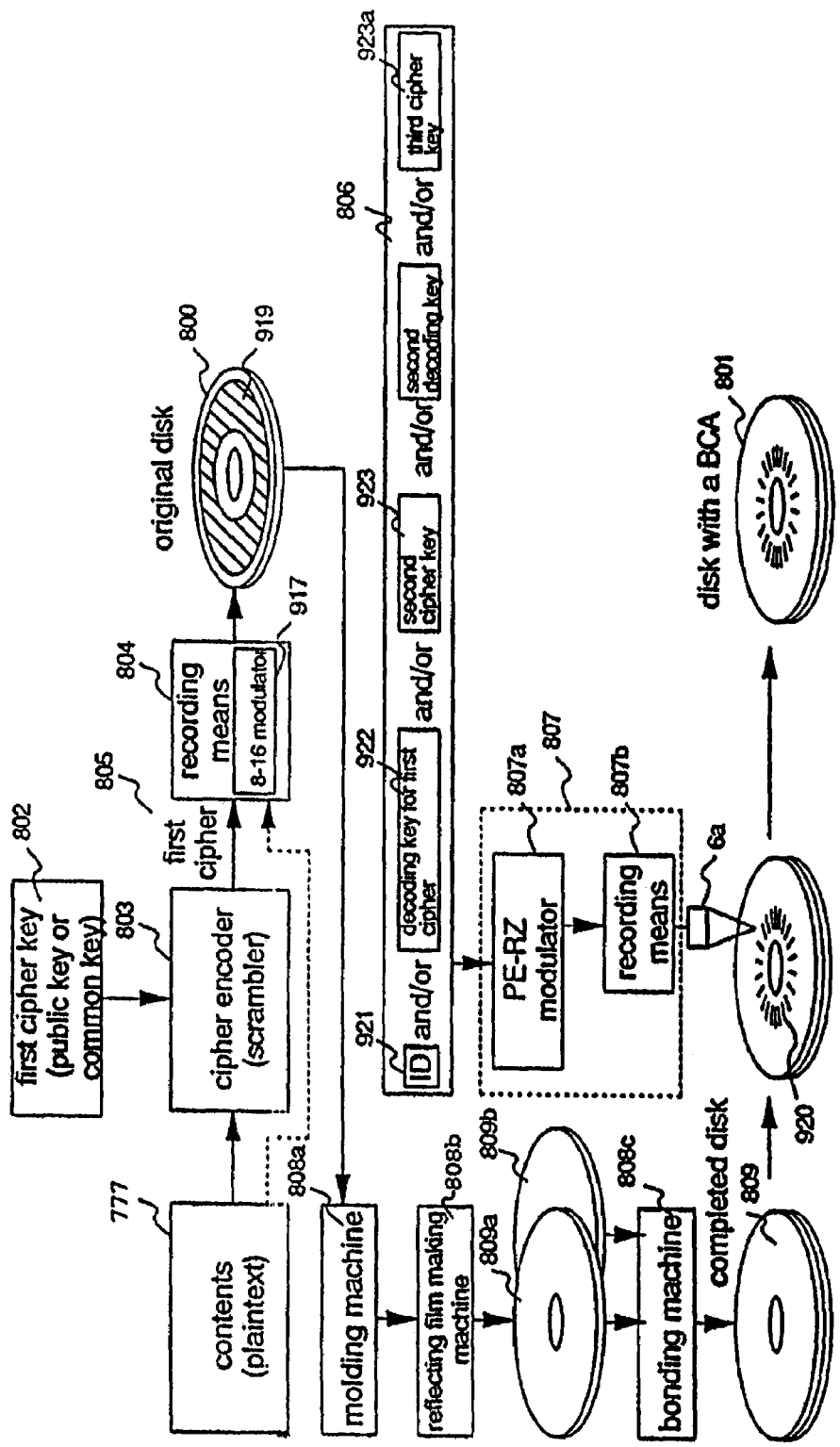
FIG. 1 is a flow chart of an optical disk according to an embodiment of the present invention.

At the end of this specification is appended a list identifying items corresponding to the reference numerals used in the aforementioned drawings, that listing being in consecutive numerical order of the reference numerals.

DETAILED DESCRIPTION OF THE INVENTION

The present invention will be described on the basis of a number of embodiments. Herein, an additional recording area using the BCA system is referred to as a 'BCA area', and data recorded in a BCA is referred to as 'BCA data'. In addition, first identification data is referred to as 'ID' or 'disk ID'.

FIG. 1 shows a typical process for producing a disk with a BCA. The first cipher key 802, such as a public key, is used by a cipher encoder or scrambler 803 to encipher contents 777 into the first cipher 805. An 8–16 modulator 917, such as a mastering unit, modulates the first cipher 805. A laser records the modulated signal as pits in the first recording area 919 of an original disk 800. A molding machine 808a uses the original disk 800 to mold disk-like transparent substrates (not shown). A reflecting film making machine 808b forms reflecting A1 films, and makes single-sided disks 809a and 809b which are each 0.6 millimeter thick. A bonding machine 808c laminates these disks together to make a completed disk 809. A trimming unit 807 modulates the disk ID 921, the first cipher decoding key 922, or the second cipher key 923 for Internet communication in the second recording area 920 of the completed disk 809, with a Phase Encoding-Return to Zero (PE-RZ) modulator 807a, which combines PE modulation and RZ modulation. A pulse laser 807b effects BCA trimming to make a disk 801 with a BCA. Because laminated disks are used, it is not possible to alter the BCA inside, and thus the completed disk can be used for security.

A BCA will next be explained briefly.

As shown in FIG. 2a, a pulse laser 808 trims the reflecting aluminum films of the two-layer disk 801 in a BCA to record a stripe-like low reflection part 810 on the basis of a PE modulating signal. As shown in FIG. 2b, BCA stripes are formed on the disk. If the stripes are reproduced by a conventional optical head, the BCA has no reflecting signal. Therefore, as shown in FIG. 2c, gaps 810a, 810b and 810c are produced, where the modulating signal is missing. The modulating signal is sliced at the first slice level 915. But, the gaps 810a–c have a low signal level, and can therefore be sliced easily at the second slice level 916. As shown with the recorded and reproduced waveforms in FIGS. 3a–3g, it is possible to reproduce the formed bar codes 923a and 923b by level-slicing them at the second slice level 916 by a conventional optical pickup as shown in FIG. 3e. As shown in FIG. 3f, the waveforms of the codes are shaped by a LPF filter so as to PE-RZ decode the codes. As shown in FIG. 3g, a digital signal is output.

Figure 4:
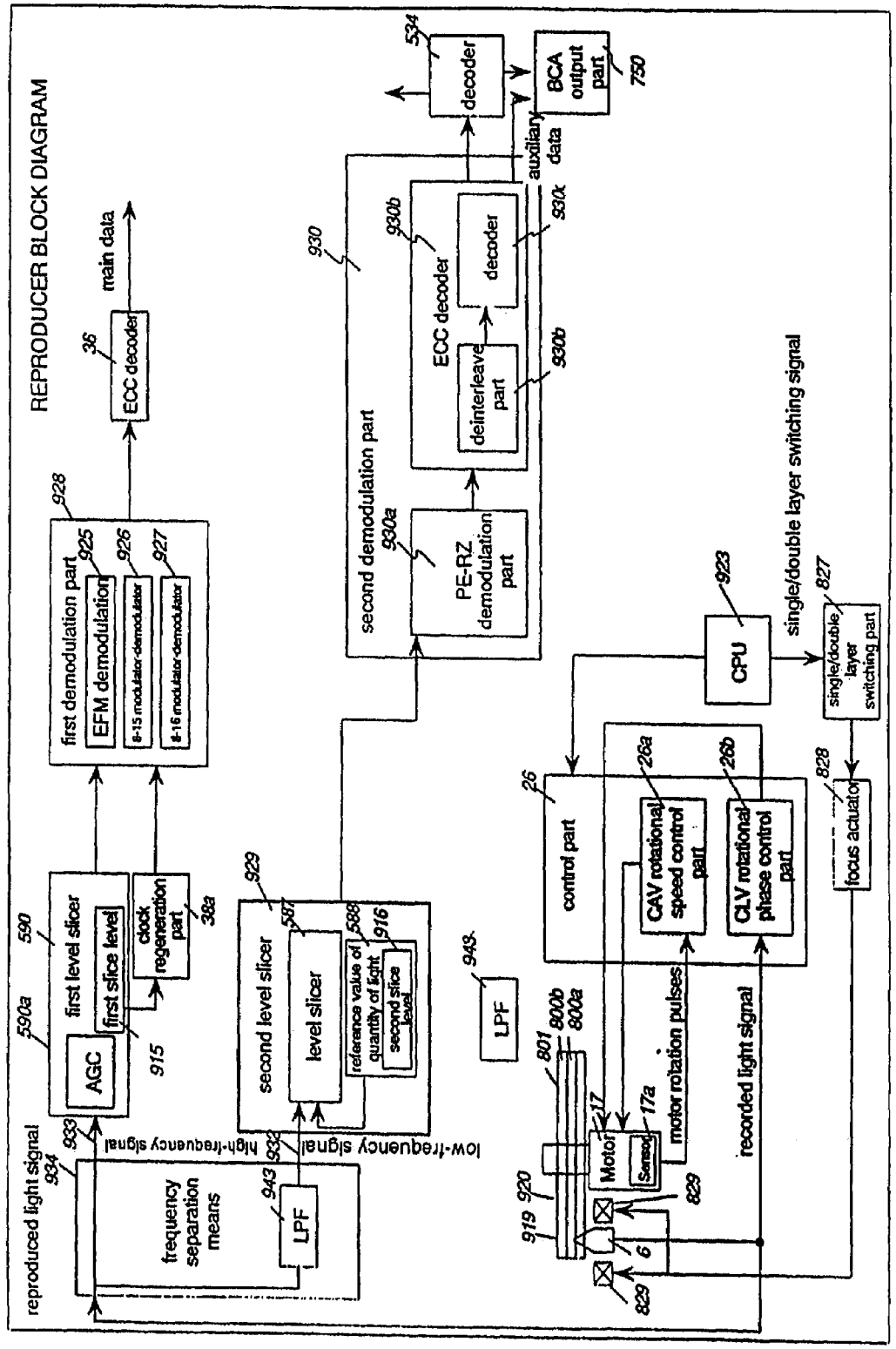
FIG. 4 is a block diagram of a reproducer according to an embodiment of the invention.

With reference to FIG. 4, the decoding operation will be explained. A disk 801 with a BCA includes two transparent substrates, which are laminated with a recording layer 801a between them. The recording layer may either be a single layer 801a or include two recording layers 800a and 800b. If there are two layers, a BCA flag 922 is recorded in the control data of the first recording layer 800a, which is adjacent to the optical head 6. The flag 922 indicates whether a BCA is recorded or not. Because a BCA is recorded in the second layer 800b, the first recording layer 800a is focused on first, and the optical head 6 is moved to the radial position of the control data 924 in the innermost edge of the second recording area 919. The control data is main data, and has therefore been Eight to Fourteen Modulation (EFM), 8–15 or 8–6 modulated. Only when the BCA flag 922 in the control data is '1', a single/double layer switching part 827 focuses on the second recording layer 801b to reproduce the BCA. If the signal is sliced by a level slicer 590 at the general first slice level 915 as shown in FIG. 2c, it is converted into a digital signal. This signal is demodulated in the first demodulation part by an EFM demodulator 925, an 8–15 modulator-demodulator 926 or an 8–16 modulator-demodulator 927. An ECC decoder 36 corrects errors, if any, and outputs main data. The control data in the main data is reproduced and only if the BCA flag 922 is 1 is the BCA read. When the BCA flag 922 is 1, a Cpu 923 orders the single/double layer switching part 827 to drive a focus adjustment part 828, switching the focus from the first recording layer 800a to the second recording layer 801b. At the same time, the optical head 6 is moved to the radial position of the second recording area 920, that is, for the DVD standard, the BCA is recorded between 22.3 and 23.5 mm from the inner edge of the control data. Then the BCA is read. Reproduced in the BCA area is a signal with a partially missing envelope as shown in FIG. 2c. By setting in the second level slicer 929 the second slice level 916 of which the quantity of light is smaller than that of the first slice level 915, it is possible to detect the missing parts of the reflecting portion of the BCA, and a digital signal is output. This signal is PE-RZ demodulated by the second demodulation part 930, and ECC decoded by an ECC decoder 930b so as to output BCA data, which is auxiliary data. Thus, the first demodulator 928, operative according to, 8–16 modulation demodulates and reproduces the main data, while the second demodulation part 930 operative according to PE-RZ modulation demodulates and reproduces the auxiliary data, that is, the BCA data.

FIG. 5a shows the reproduced waveform before passage through a filter 943. FIG. 5b shows the working size accuracy (precision) of the slits of the low reflecting portion 810. It is difficult to make the slit width less than 5 mm. In addition, if the data is not recorded inward radially from 23.5 mm, it will not be properly reproduced. Therefore, for a DVD, because of the limitations of the shortest recording cycle of 30 mm and the maximum radius of 23.5 mm, the maximum capacity after formatting is limited to 188 bytes or less.

The modulating signal is recorded as pits by the 8–16 modulation mode, and a high frequency signal such as the high frequency signal part 933 in FIG. 5a is obtained. However, the BCA signal is a low frequency signal like low frequency signal part 932. Thus, if the main data complies with the DVD standard, it is a high frequency signal 932 which is about 4.5 MHz or less, shown in FIG. 5a, and the auxiliary data is a low frequency signal 933 which is 8.92 ms in period, that is, about 100 kHz. It is therefore relatively simple to frequency-separate the auxiliary data with a LPF 943. A frequency-separating method 934 as shown in FIG. 4, including the LPF 943 can easily separate the two signals. In this case, the LPF 943, may be simple in structure.

The foregoing is an outline of the BCA.

Figure 6:
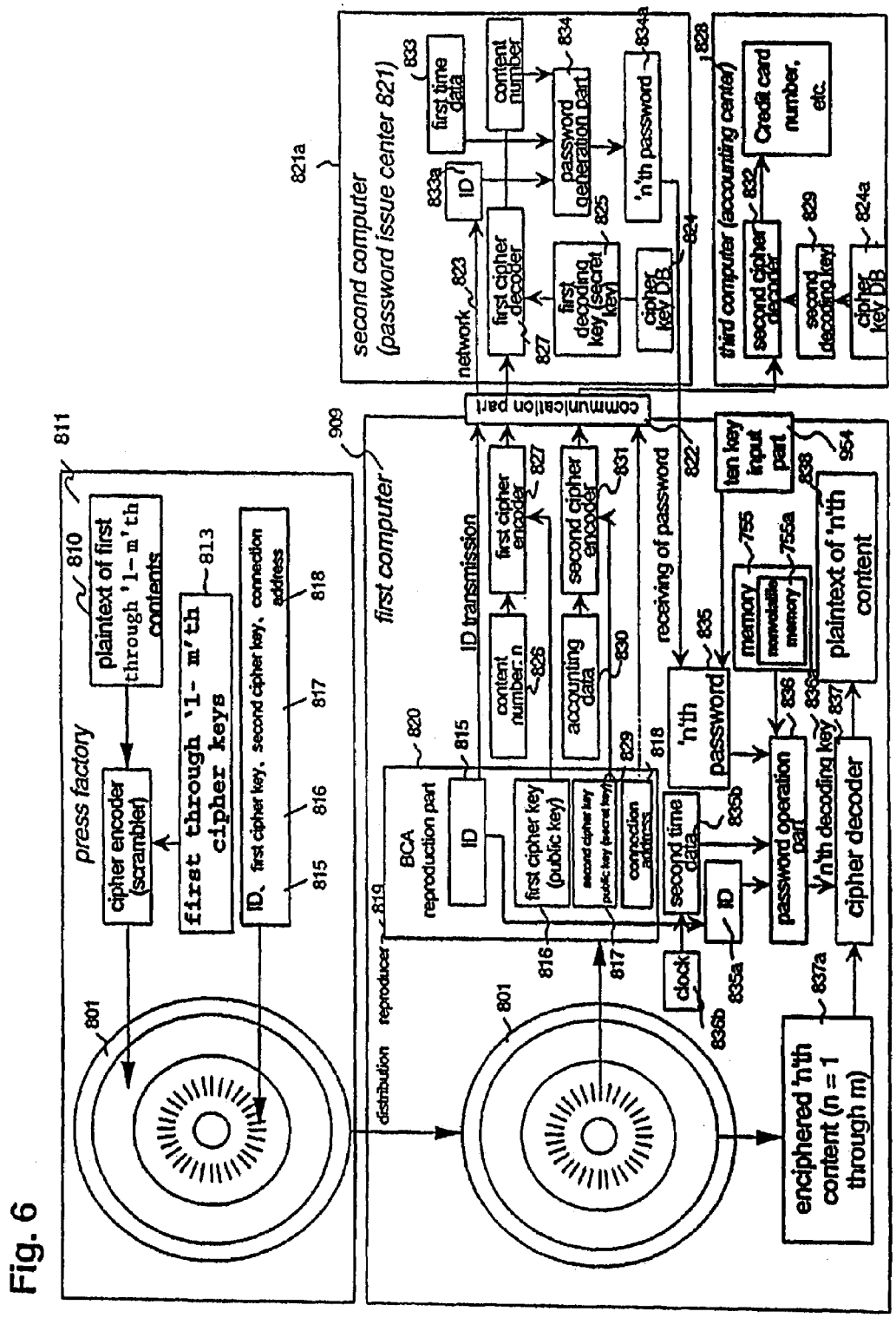
FIG. 6 shows a method of cryptocommunication and a cipher key method by means of a password according to an embodiment of the present invention.

With reference to FIG. 6, the overall system of a cipher software unlatching system, narrowed down to the operations of password issue, cryptocommunication, and orderer certification, will be described. The steps in a press factory are nearly the same as in FIG. 1, so the original disk 800 and the completed disk 809 are not shown.

In a press factory 811, a cipher encoder 812 enciphers the data in the plaintexts 810 of the first to the '1-m'th contents or scrambles the picture signals therein with the first to '1-m'th cipher keys 813, respectively. The data or the signals are then recorded on an original optical disk 800. Disk-like substrates 809 are pressed from the original disk 800. After a reflecting film is formed on each substrate 809, the two disk-like substrates are laminated together. Thereafter a completed disk 809 is made. Recorded in the BCA areas 814 of completed disks 809 are different IDs 815 and/or first cipher keys 816 (public keys) and/or second cipher keys 817 (public keys) and second computer connection addresses 818 so as to make disks 801 each with a BCA. The disks 801 are distributed to users.

The contents of these disks have been enciphered. Therefore, in order to reproduce the contents of each of the disks, it is necessary to get a password from a password issue center, an electronic shop or a mall, by paying a charge. That procedure will be described next.

In a user's first computer 909, if a reproducer 819 reproduces a distributed disk 801 with a BCA, a BCA reproduction part 820 including a PE-RZ demodulation part reproduces the data of the ID 815, first cipher key 816, second cipher key 817 and/or connection address 818. In order to get a password, the connection address 818 of the second computer 821*a*, which is the server of a password issue center 821, is accessed through a communication part 822 via the Internet or another network 823, and the ID is transmitted to the second computer 821*a*.

Here, the cryptocommunication procedure will be described. The second computer 821*a* receives the ID 815 from the user's reproducer 819. Then, the second computer or server 821*a* of the password issue center 821, which is called a 'mall' or an 'electronic shop' has a cipher key database 824. This database contains a table of the secret keys which are the decoding keys corresponding to the disks' own IDs or the first cipher keys 816 of the IDs, that is the first decoding keys 825 and the IDs. The server can therefore search for the first decoding key 825 based on the received ID. Thus cryptocommunication is completed from the first computer to the second computer 821*a*. In this case, if the first cipher key and first decoding key are common keys of a common key cipher, not of an public key cipher, they are the same key.

If the user wants to use part of the enciphered contents stored on the disk 801, which may be 1,000 in number, for example, the content number 826 of which is 'n', the user sends to the second computer 821*a* the cipher which is the content number 826, that is, 'n' enciphered with the public key which is the first cipher key 816 by the first cipher encoder 827 composed of public key cipher functions. The second computer 821*a* searches for the first decoding key 825 for decoding this cipher as stated above. It is therefore possible securely to convert this cipher into plaintext. Thus, the cipher protects the privacy of the user's order data.

In this case, a signature may be made by means of the secret key of the public key cipher as the first cipher key 816. This method is called 'digital signature'. For a detailed explanation of the operation of 'digital signature', see, for example, 'Digital Signature of E-Mail Security by Bruce Schneider 1995'.

Back to the cryptocommunication, the cipher is sent through the communication part 822 and network 823 to the first cipher decoder 827 of the password issue center 821. Thus the first cipher decoder 827 decodes the cipher by means of the first pair cipher key 825 pairing with the first cipher key 816.

In this case, because only the one disk has the public key, it is possible to reject invalid orders from third parties' disks. In other words, because each disk can be certified, it is possible to certify the user who owns the disk. It is thus certified that the content number 'n' represents a particular individual's order. It is therefore possible to exclude invalid orders of third parties.

If the public key 816 is secret, this method can technically be used to send a credit card number, or other accounting data which requires high security. Generally shops called 'malls' however, do not settle users' accounting data electronically, because there is no guarantee of security. Only the accounting centers 828 of credit card companies, banks and the like can deal with users' financial data. Presently, security standards such as secure electronic transaction (SET) are being unified, so it is probable that Rivest, Shamir and Adleman (RSA) 1024 bit public key ciphers will be used and the encipherment of financial data will be possible.

Next, the accounting data cryptocommunication procedure of the present invention will be shown. First, by using the second cipher key 817 of the public key cipher reproduced by the BCA reproduction part 820, the second cipher encoder 831 enciphers the accounting data 830 such as an individual's credit card number with a public key system cipher such as RSA. The enciphered data is sent from the communication part 822 through the second computer 821 to the cipher decoder 832 of the third computer 828. In this case, if there is need for digital signature, the secret key 829 is used as the second cipher key 817.

Similar to the procedure for the cipher key of the second computer 821*a* of the password issue center 821, it is possible to search the cipher key database 824*a* for the second decoding key 829 corresponding to the ID or the second cipher key 817. By using this decoding key 829, the second cipher decoder 832 can decode the enciphered accounting data.

If a digital signature is made by the second cipher encoder 831 with the secret key 829, the user's signature can be confirmed in the second cipher decoder 832. The accounting center 828 can thus get the user's credit card number, bank card number, bank password, or other accounting data safely even via the Internet. In open networks such as the Internet, security comes into question. By means of this system, however, it is possible to make cryptocommunication or certification without fault, because the cipher key (public key) for cryptocommunication or the secret key for digital signature has been recorded in the BCA. It is therefore possible to prevent third parties' unauthorized accounting and orders. In addition, because it is possible to use various public keys for different disks, that is, different users, the confidentiality of communication is improved, and the possibility of users' accounting data leaking to third parties is reduced.

Referring back to FIG. 6, the procedure for issuing a password and the procedure for unlatching with a password will be explained. The password issue center 821 includes a password generation part 834 with an operation expression of public key ciphers etc. Part 834 generates a password on the basis of three data fields, namely, the ID, the content number which the user wants to unlatch, and the time data representing the period of use allowed. The generated password is sent to the first computer 909. In the simplest structure example, the second computer enciphers with the public key for the public key cipher the data which is a mix of the decoding key disk ID for releasing the cipher of the '1-n'th content and the timing data, prepares at the password generation part 834 the '1-n'th password 834*a* which is a mix of secret keys for unlatching the enciphered data, and sends this password 834*a* to the first computer 909. The first computer 909 receives the '1-n'th password, and decodes with the secret key the mixed keys of the disk ID, the timing data and the '1-n'th content. Here, the password operation part 836 checks the ID 835*a* of the BCA reproduced from the disk, the present second timing data 835*b*, the allowed ID 833*a* and the first timing data 833, and operates to determine if they coincide. If they do coincide, they are allowed. The '1-n'th decoding key 836*a* is output to the cipher decoder 837. The cipher 837*a* of the '1-n'th content is decoded. The '1-n'th content 838 then is output. The period of output is limited to the time during which the first timing data 833 and second timing data 835*b* coincide. The password operation part 836 of the first computer 909 computes three data fields, which are the ID, the password 835 and the timing data from the clock 836b representing the present time. If the ID and timing data are correct, the correct decoding key is output as the result of the computation. Therefore, the cipher decoder 837 decodes or descrambles the '1-n'th cipher, outputting the plaintext data of the '1-n'th content 838, or a descrambled picture signal or audio signal.

In this case, if the second timing data 835b of the clock 836b does not coincide with the first timing data 838 of the password, the cipher is not correctly decoded and therefore not reproduced. If timing data is used, it can be applied to time-limit type rental systems, so that a movie can be reproduced for only three days during a rental period.

While FIG. 6 shows the procedure in a block diagram, the flowcharts of the procedure will be explained later with reference to FIGS. 16–23.

Next, the system for the cipher key will be described. By putting, as shown in FIG. 7a, both the first cipher key 816 and second cipher key 817 in the BCA, it is possible to provide two securities, for a commodity deal with a shopping mall and an account settlement with an 'accounting center'.

In this case, with respect to the security with an accounting center, it is planned to unify standards such as SET, so that an RSA 1024, that is 128 byte cipher key, will be stored in the second cipher key area 817a. Then, because the BCA has only 188 bytes, only 60 bytes remain for the cipher key for dealing with a shopping mall. An elliptic function system public key cipher is a cipher function which is 20 bytes in magnitude and which has a security level equal to that of 128 bytes of RSA 1024.

An elliptic function is used in the first cipher key area 816a of the present invention. An elliptic function can obtain 20 byte security, which is equivalent to RSA 1024. Therefore, by using an elliptic function, it is possible to store both the first cipher key 816 and second cipher key 817 in the 188 byte BCA area.

By applying a BCA to an optical ROM disk, as stated before, it is possible to record a disk's own ID number, the first and second cipher keys, and a connection address. In this case, if the Internet is used, a mall is accessed automatically, and merely by distributing disks with cipher keys recorded in the BCAs, security is possible for distribution of commodities by releasing the ciphers of contents, certification and keeping secret purchase of goods, certification and keeping secret when accounts are settled, and the like. Therefore, the method of cryptocommunication of the present invention can, without lowering security, omit and rationalize the conventional operations of using IC cards, floppy disks and/or letters to distribute IDs and/or cipher keys to users. This is a great advantage. Furthermore, a URL, which is an Internet connection address, is not fixed, but changeable. The URL is recorded in the original disk, and may be accessed. It is, however, not efficient from the points of view of time and cost to vary the original disk when a URL change is made. By having recorded the changed URL in the BCA, and connecting the BCA connection address 931 instead of the connection address of the original disk only if the connection address 931 is reproduced from the BCA, it is possible to access the changed address 931 without preparing a new original disk.

FIG. 6 shows a case where the first key of the public key and the first key of the public key have been recorded in the BCA.

Figure 8:
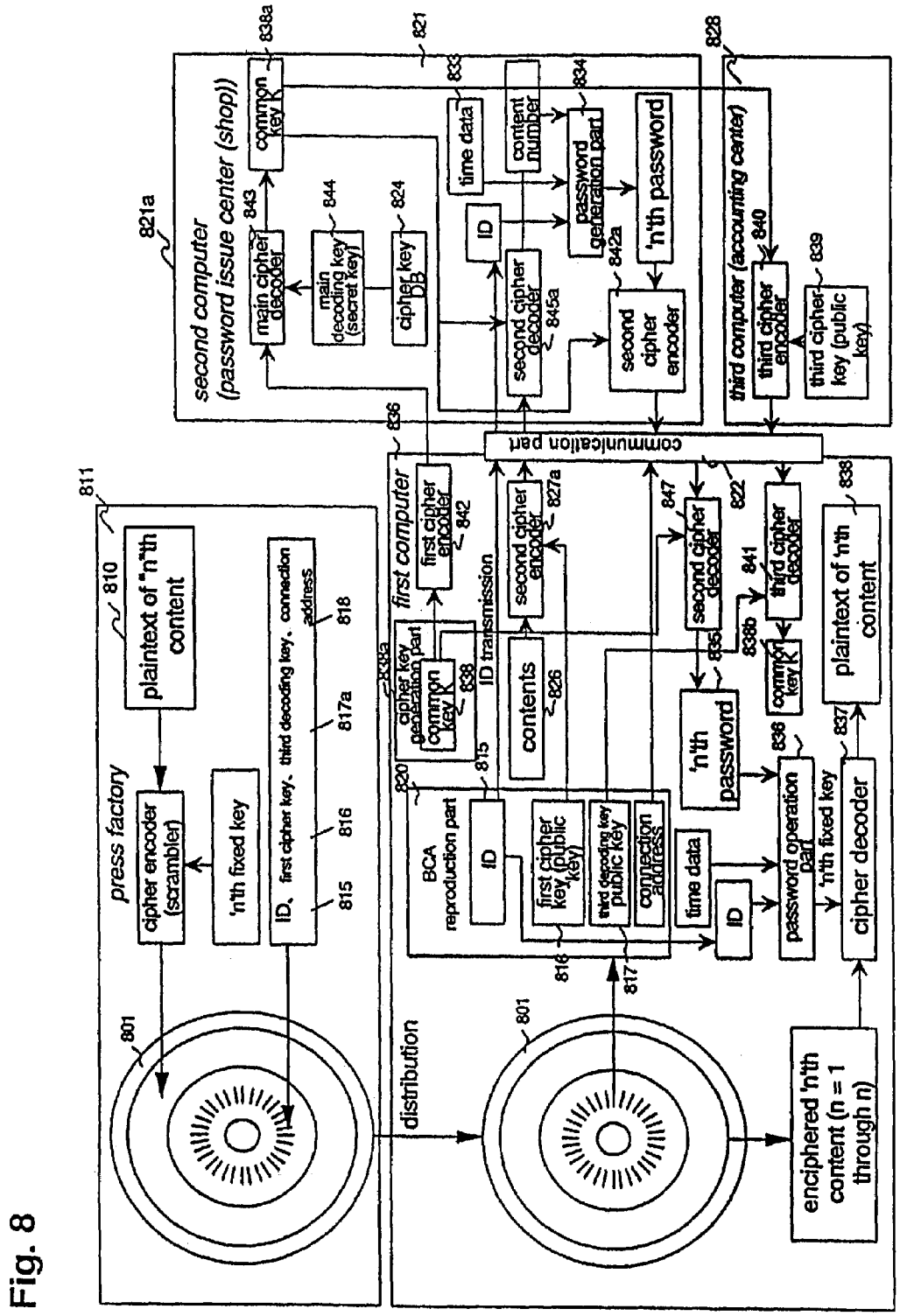
FIG. 8 shows a method of cryptocommunication and a method of unlocking a cipher with a password according to an embodiment of the invention.

FIG. 8 shows two diagrams, in one of which the first cipher key 816 of the public key and the third decoding key 817a of the secret key have been recorded in the BCA. In the other diagram, a cipher key is produced for cryptocommunication. Because the procedure is similar to that of FIG. 6, only different points will be described. First, in a press factory, the first cipher key 816 and third decoding key 817a are recorded in the BCA. The third decoding key 817a is used to receive the cipher enciphered with the public key from an accounting center. In this case, the reception security is improved.

First, with reference to FIG. 8, a more specific example of cryptocommunication where a cipher key is generated will be described. Because the first cipher key 816 is a public key, it is necessary to record the third decoding key 817a for reception in the BCA. But the BCA has a mall capacity. In addition, the public key needs processing time. Therefore, in FIG. 8, the cipher key generation part 838a of the first computer 836 generates a pair of a cipher key and a decoding key for the public key or a common key by means of a random number generator or the like. An example of the common key will be described. A common key K 838 is enciphered with the first cipher key 816 and first cipher encoder 842, and sent to the second computer 821a. The second computer uses the main decoding key 844 to convert this cipher into plaintext by means of the main cipher decoder 843, obtaining a common key K 838a. Because both have the common key K, it is possible to make cryptocommunication from a shop to a user, that is, from the second computer 821a to the first computer 836 by delivering the common key K to the second cipher encoder 842a and second cipher decoder 847a. Naturally, it is also possible to make cryptocommunication from the user to the shop, that is, from the first computer 836 to the second computer 821a by delivering the common key K to the second cipher encoder 827a and second cipher decoder 845a. The effects of the method of recording in the BCA the first cipher key which is a public key and generating a cipher key will be stated. First, it is necessary only to record the first cipher key, so that the recording of the decoding key can be omitted. Therefore, the small capacity of the BCA is not reduced. Second, because the decoding key is recorded in the BCA, the security is improved. The common key may be changed each time.

Because of the short operation time, the processing time is short. In this case, if the cipher key generation part 838a has generated a pair of a cipher key and a decoding key of a public key cipher, not a common key, it is possible to make the security higher than that with the common key, though the processing time is longer, by cryptically sending the cipher key to the second computer 821a, using this key as the cipher key of the second cipher encoder 842a, and using the decoding key as the decoding key of the second cipher decoder 847. If the performance of the processing CPU is high, it is preferable that the public key be used. If a new public key is generated, only the public key for the first cipher key is recorded in the BCA, so that no problems of security arise. No capacity of the BCA is consumed either. In addition, because it is not necessary to change the cipher key, maintenance is easy.

This time, if the common key K 838 is defined at the second computer 821a of the password issue center 821, the common key is enciphered with the third cipher key 839 by the third cipher encoder 840, and sent to the personal computer 836. By using the third decoding key 837 which is the secret key reproduced from the BCA, the third cipher decoder 841 of the personal computer 836 makes a translation into plaintext to obtain a common key K 838b. In this case, because only this user has the third decoding key 817a which is the secret key, it is possible to prevent the contents of communication from the center to the user from leaking to third parties. The format of this case is shown in FIG. 7*b*. If an elliptic function is used, the third decoding key 839*b* may be 20 bytes, and can therefore be stored in the BCA.

Figure 9:
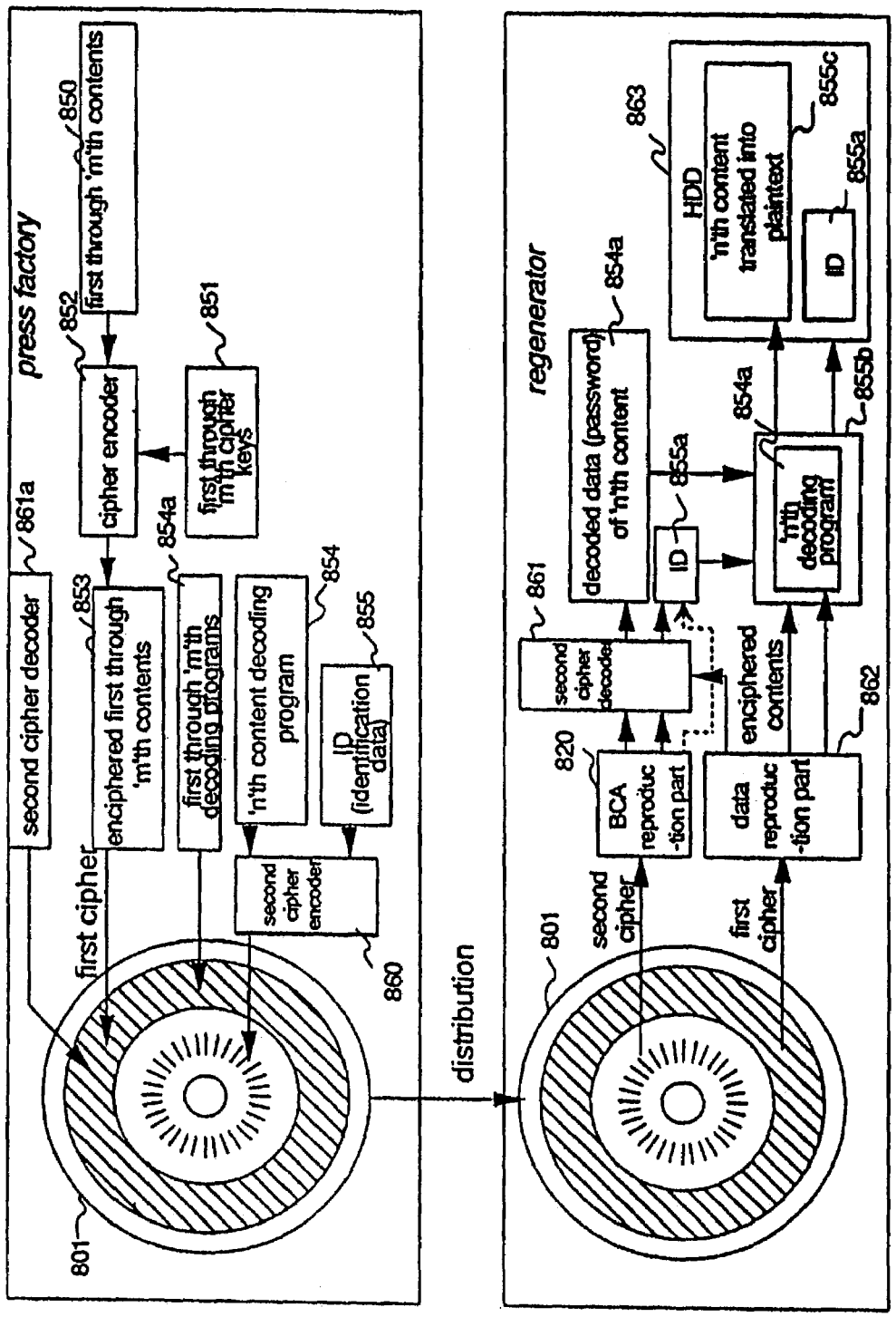
FIG. 9 shows a procedure for operation of a disk, the content part of which may have been licensed, according to an embodiment of the invention.

FIG. 9 shows a system for reducing the costs of preparing an original disk by using a BCA in an encipherment disk.

If there is a number 'n' of, for example, 1,000 plaintext contents 850, the cipher encoder 852 enciphers them with the first to the 'm'th cipher keys 851, respectively. The ciphered first to the 'm'th contents 853, the decoding program 854*a* for the first to 'm'th contents, and the second cipher decoder 861*a*, which is the program for decoding the second cipher, are recorded as pits in an original disk and then molded into a substrate, and a reflecting film is formed. Thereafter, two substrates are laminated together to complete an optical disk 801. The second cipher encoder 860 enciphers the decoding data 854 such as the password for unlatching the '1-n'th, for example, the first content, and the decoding key. Recorded in advance in the BCA of the first disk are the disk's own identification data, that is, the ID 855 and the second cipher which is the enciphered decoding data. Then, in the reproducer, the second cipher is reproduced from the BCA reproduction part 820. The second cipher decoder 861 is reproduced from the data reproduction part 862, which reproduces the ordinary recorded data other than the BCA. Therefore, the second cipher decoder 861 is used to decode the second cipher, reproducing the ID 855*a* and '1-n'th password 854*a*. The cipher decoder 855*b* uses the decoding program 854*a* for the '1-n'th content reproduced from the data reproduction part 862, and uses the ID 855*a* and password 854*a* to decode the first cipher, obtaining the plaintext 855*c* of the '1-n'th content and the identification data 855*a*. For a personal computer, the content and ID are recorded on the hard disk 863. This ID 855*a* checks to determine if there is no same ID on a network when the program has started, and the ID 855*a* actuates the network protection. It is therefore possible to prevent the software from being illegally installed. This is yet another advantage of the present invention. For example, if 1,000 enciphered contents are stored and decoding data such as a password corresponding to a particular software application are recorded on an original disk, this is equivalent in substance to the preparation of an optical ROM disk for a particular content. It is possible to obtain with one original disk the same effect as in the case where original disks for 1,000 kinds of software are cut. It is therefore possible to reduce the costs and time or labor for preparing an original disk.

Figure 10:
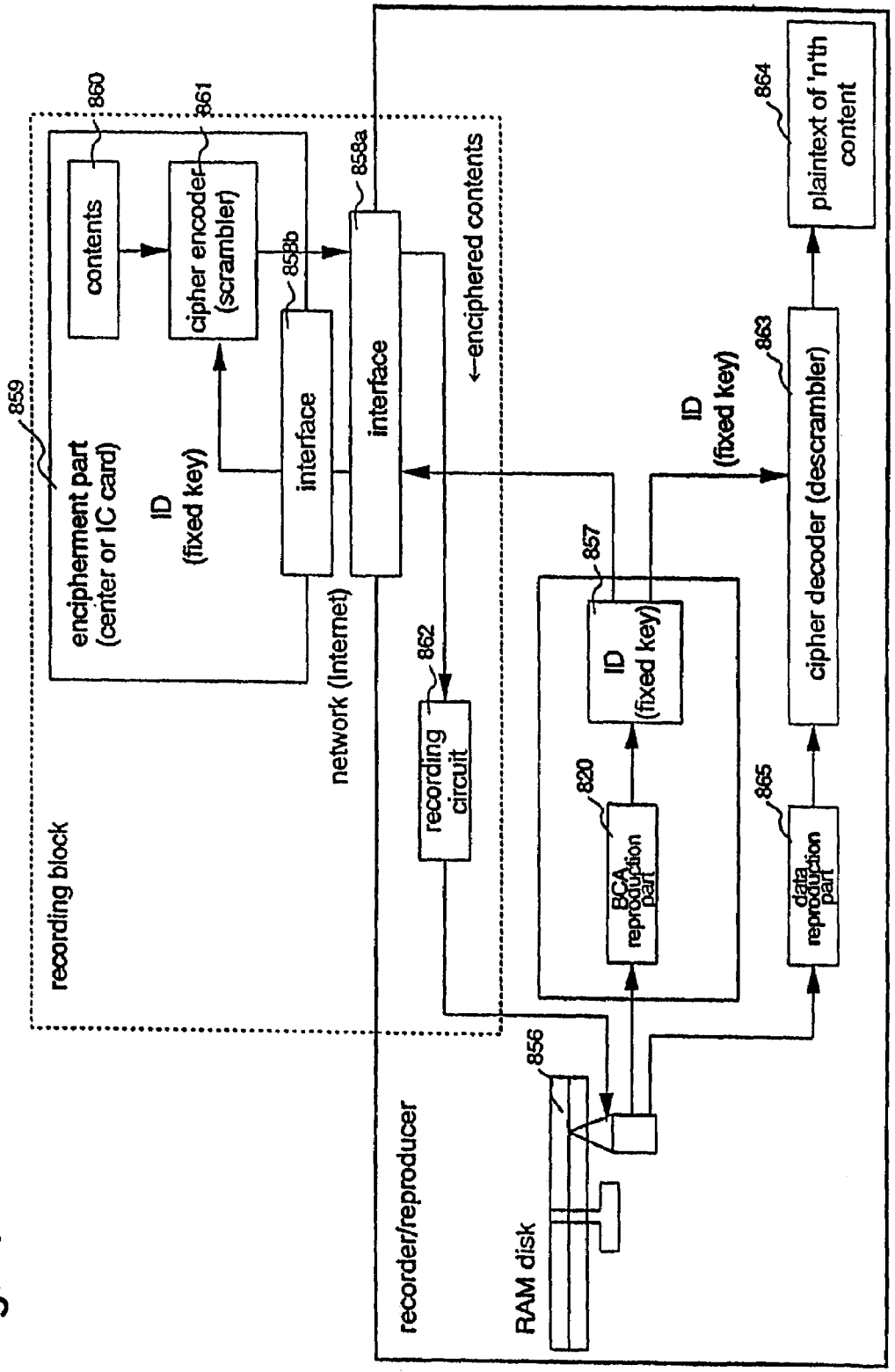
FIG. 10 is a block diagram of an example wherein a BCA has been recorded in a RAM disk according to an embodiment of the present invention.

Described with reference to FIG. 10 is the procedure for enciphering contents with a BCA when recording them on a RAM disk. First, the BCA reproduction part 820 reproduces the BCA data from the RAM disk 856, outputs an ID 857, and sends it through the interfaces 858*a* and 858*b* and the network to the encipherment part 859. The cipher encoder 861 of the encipherment part 859 enciphers contents 860 or scrambles picture and sound signals by means of a key including the ID 857. The enciphered contents are sent to the recorder/reproducer, where the recording circuit 862 records them on the RAM disk 856.

Next, when this signal is reproduced, the data reproduction part 865 demodulates the main data to reproduce the enciphered signal, and the cipher decoder 863 decodes the reproduced signal. The BCA reproduction part 820 reproduces data containing the ID 857 from the BCA area of the RAM disk 856. The reproduced data is sent as part of the key to the cipher decoder 863. If normally copied, the cipher key recorded in the RAM disk is a normal disk ID. The RAM disk ID, also, is a normal disk ID. Therefore, the cipher is decoded or descrambled to output the plaintext 864 of the '1-n'th content. For a graphic data, for example, the MPEG signal is extended to obtain a picture signal.

In this case, the disk ID is the key for encipherment. Because each disk is unique, it can be copied on only one RAM disk.

If a disk ID is copied from a normal RAM disk to another RAM disk, ID1 which is the original normal disk ID differs from ID2 which is the disk ID of the other, unauthorized, RAM disk. If the BCA of the unauthorized RAM disk is reproduced, ID2 is reproduced. The contents are ciphered with ID1, however, so that, even if unlatching is attempted with ID2 at the cipher decoder 863, the cipher is not decoded because the key differs. Thus, the signal of the illegally copied RAM disk is not output, so that the copyright is protected. The present invention uses a disk ID system. Therefore, by reproducing with any drive the normal RAM disk copied normally only once, it is possible to unlatch the cipher. The encipherment part 859 may, in place of the center, be an IC card with a cipher encoder.

Figure 11:
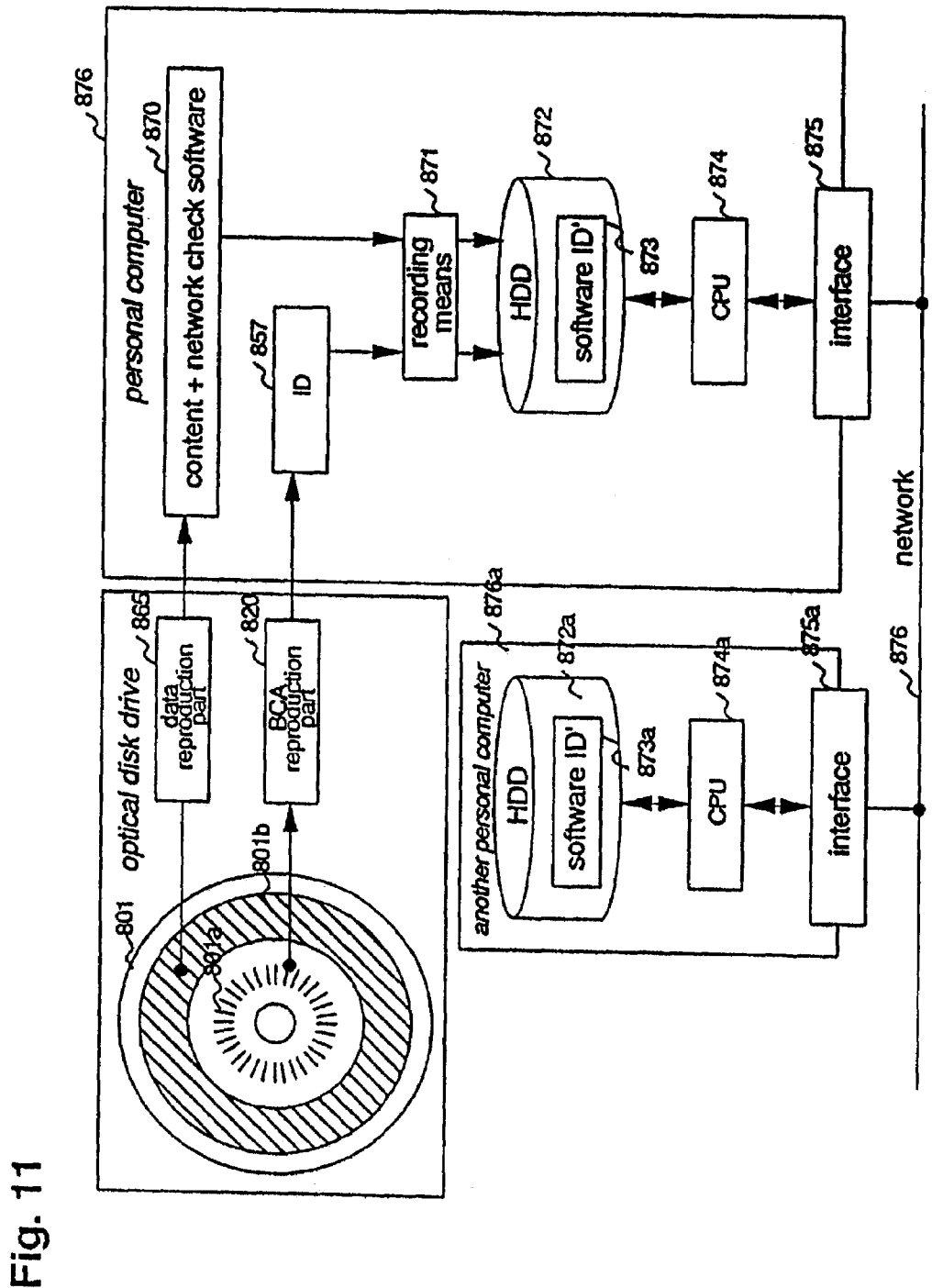
FIG. 11 is a block diagram of a method or system for prevention of unauthorized copying according to an embodiment of the invention.
Figure 12:
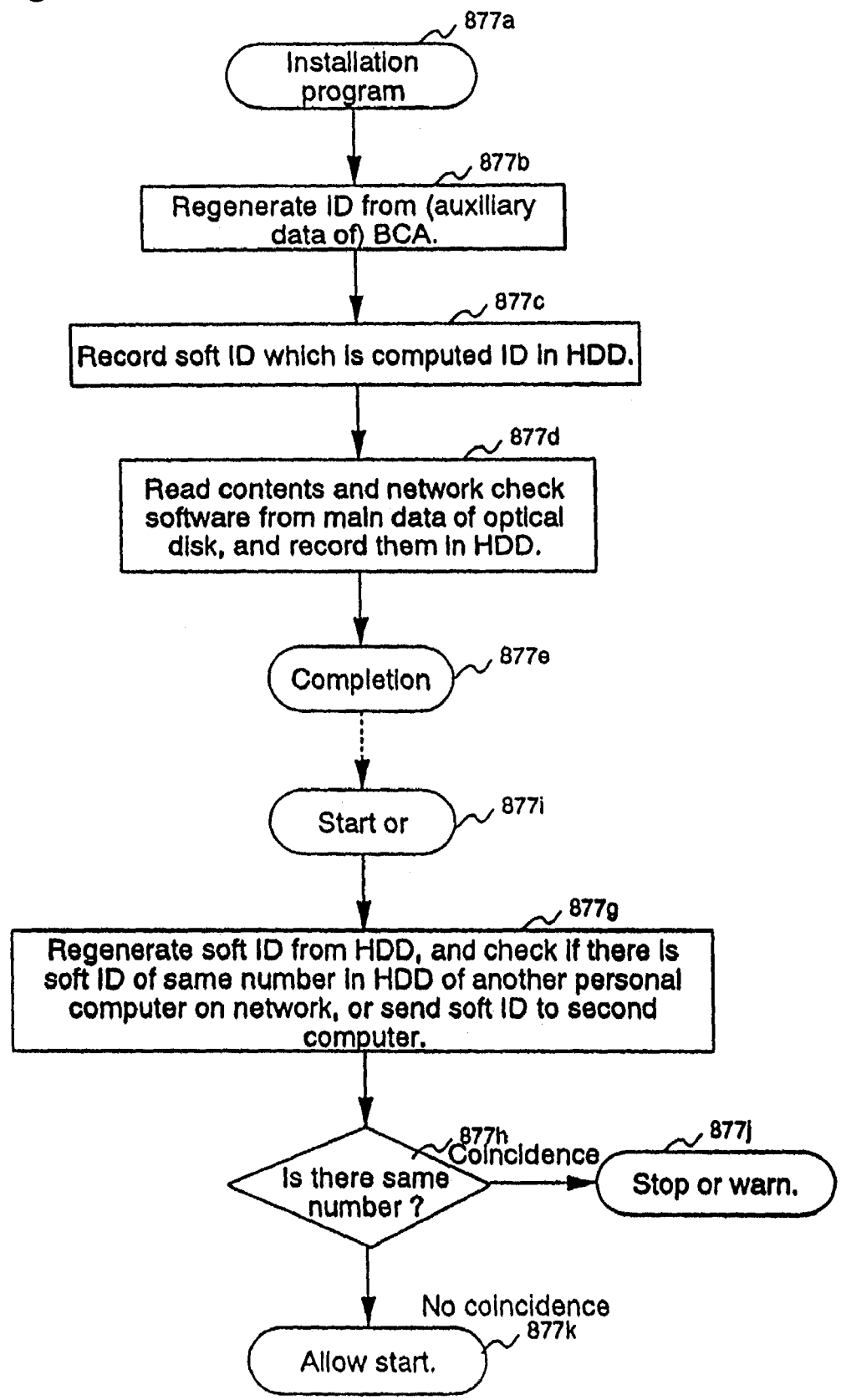
FIG. 12 is a flow chart depicting preventing unauthorized copying according to an embodiment of the invention.

With reference to the block diagram of FIG. 11 and the flowchart of FIG. 12, the method of preventing copying will be described. At Step 877*a*, the installation program is actuated. At Step 877*b*, the BCA reproduction part 820 outputs the ID of the auxiliary data from the laminated optical disk 801. At Step 877*d*, the data reproduction part 865 reproduces the contents and network check software 870 from the main data. The contents and the ID 857 are recorded on the EDD 872. At Step 877*c*, the ID 857 is encoded with a particular secret cipher so as not to be altered illegally, and is recorded as a soft ID in the HDD 857. Thus, the soft ID 873 is recorded together with the contents on the HDD 872 of a personal computer 876. Here described is the case where the program is started at Step 877*f* of FIG. 12. When the program is started, the procedure goes to Step 877*g*, where the soft ID 873 of the HDD 872 is reproduced, and the soft ID 873*a* in the HDD 872*a* of another personal computer 876*a* on a network 876 is checked through the interface 875. At Step 877*h*, a check is made to judge if the soft ID 873*a* of the other personal computer and the soft ID 873 are the same number. If so, the procedure goes to Step 877*j*, where the start of the program of the personal computer 876 is stopped or a warning message is displayed on the screen.

If the soft ID 873*a* of the other personal computer and the soft ID 873 are different, the contents are not installed in the plurality of the computers on the network. It is therefore decided that there are no illegal copies. Then the procedure goes to Step 877*k*, where the start of the program is permitted. In this case, the soft ID 873 may be sent to other personal computers through the network. This personal computer can detect illegal installation by checking duplication of the soft IDs of the personal computers. If there is illegal installation, a warning message is sent to the appropriate personal computer/s.

Thus, by recording the ID in the BCA, and recording the network check program in the pit recording area, it is possible to prevent multiple installation of the software of the same ID on the same network. In this way, simple protection from illegal copies is realized.

Figure 13:
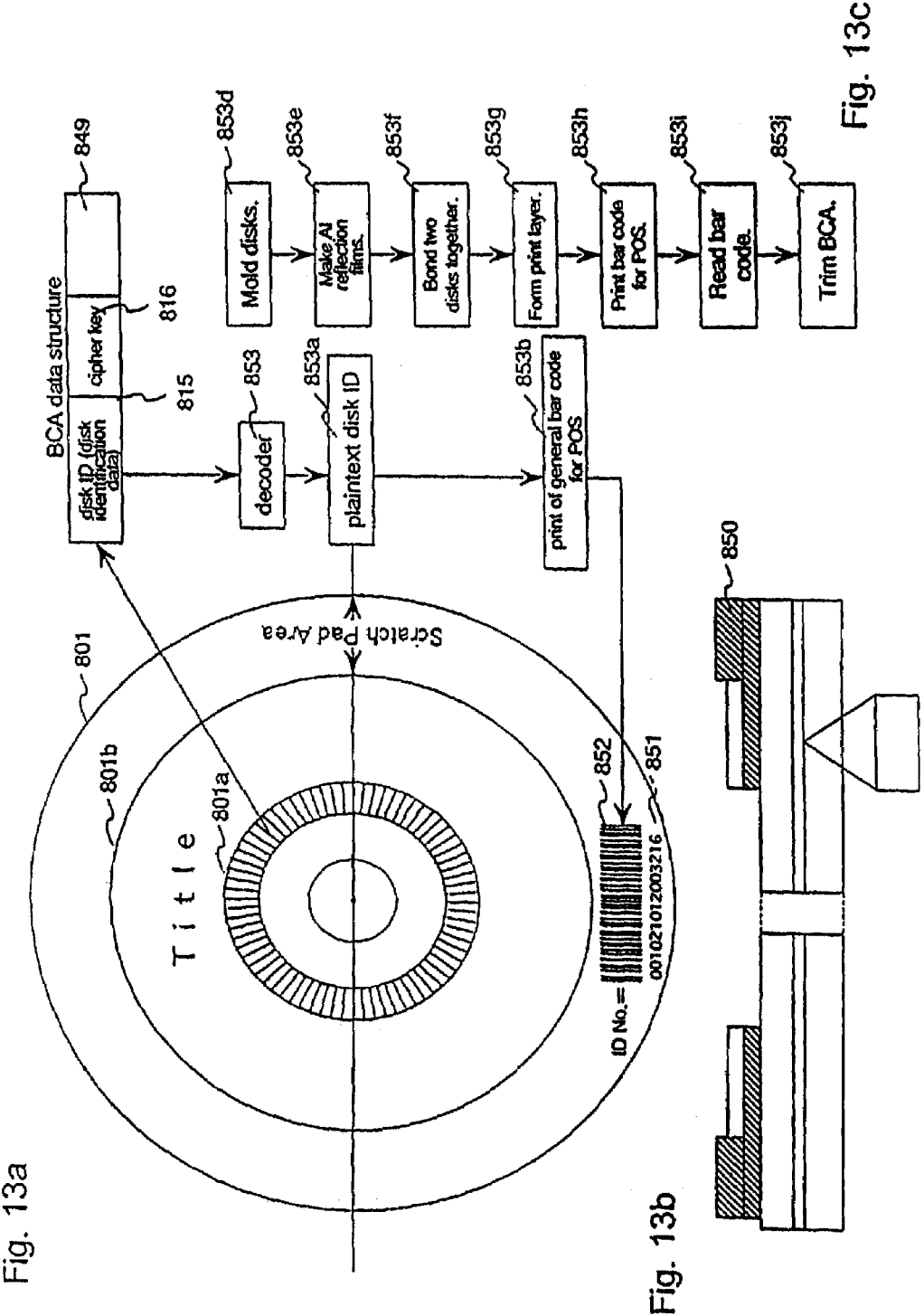
FIG. 13a is a plan view and FIG. 13b is a cross section of an optical disk, on the BCA of which an article or commodity bar code has been printed, according to an embodiment of the invention.
FIG. 13c shows a method of producing an optical disk according to an embodiment of the invention.

By, as shown in FIG. 13*a*, applying a write (writing) layer 850 of white material, on which characters or the like can be written, it is possible to not only print characters and write a password or the like with a pen, but also prevent the substrates of the optical disk from being damaged because the write layer 850 thickens. The disk ID 815, which is part of the BCA data 849 recorded by trimming in the BCA area 801*a* above the write layer 850, is translated into plaintext.

The plaintext is converted into alphanumeric characters 851. By printing the characters 851 and general bar code 852, it is possible for the store and/or user to confirm and/or check the ID with a POS bar code reader and/or visually, without reading the BCA with a reproducer. The visible ID is not necessary if the user informs the center of the ID through a personal computer. If, however, the user communicates the ID aurally by telephone to the center, it is possible to inform the center of the ID without inserting the disk in a personal computer, by printing the ID identical with the BCA ID in visible form on the disk, because the user can visually read the ID. With reference to the flowchart of FIG. 13c, the steps for is making an optical disk will be explained. At Step 853d, disks are molded from an original disk, and substrates in which pits have been recorded are made. At Step 853e, aluminum reflection films are made. At Step 853f, two disk substrates are laminated with an adhesive so that a DVD disk or the like is completed. At Step 853g, a label is printed by screen printing on one side of each disk. At this step, the original disk's own identification data is recorded in the form of a bar code. At Step 853h, an ID and/or other identification information is printed in the format of a bar code for POS on each disk by an ink jet bar code printer or a thermal-transcription bar code printer or the like. At Step 853i, the bar code is read by a bar code reader. At Step 853j, a BCA data corresponding to the identification data is recorded in the second recording area of the disk. According to this method of manufacturing, the BCA data is recorded after all the steps including the POS bar code and excluding the BCA are finished and then the disk identification data is confirmed. The BCA can be read only by reproducing the disk, but the POS bar code, which is low in density, can be read by a commercial bar code reader. The disk ID can be discriminated at every step in the factory. By recording the disk ID in the form of a POS bar code before the BCA trimming, it is possible to almost completely prevent the BCA and the POS bar code from being illegally recorded.

The method of using a BCA will be stated by which secondary recording and tertiary recording, too, can be made by the BCA method. As shown at Process 2 in FIG. 15, a software maker can also secondarily record a pirated edition prevention mark and a check cipher. At Process 2, disks 944b may be made in which different ID numbers and/or cipher keys for secret communication with users have been recorded. It is possible to replay the disks 944c and 944d without entering the passwords.

For another application, at Process 3, an enciphered or scrambled MPEG picture signal and/or other data is recorded on a disk 944e. The operation of the MPEG scramble will not be explained in detail. At Process 4, the software company makes a disk 844f in which a sub-public key for decoding the ID number and the scramble release data have been BCA-recorded secondarily. It is not possible to replay this disk solely. At Process 5, the selling store, after receiving the money for the disk, makes a password with the sub-secret key paired with the sub-public key, and records it tertiarily on the disk. Alternatively, a receipt on which the password has been printed is given to the user. Thereafter, the password has been recorded in the disk 844g, so that the user can replay it. This method prevents a disk not paid for from being replayed normally, even if the disk is shoplifted, because the scramble of the image is not released. As a result, shoplifting renders a useless product and thus decreases, If a password is BCA-recorded permanently in a rental video store or another store, a shoplifted disk can be used. In this case, as shown at Process 6, the BCA is read by a POS bar code reader in the store. A password for releasing the scramble is issued at Step 951g, printed on the receipt at Step 951i, and handed to the customer at Step 951j. The customer enters, at Step 951k, the password on the receipt in a player with numeric keys at his/her house. At Step 951p, the disk is replayed for a predetermined number of days. If a user rents a disk, given a password for only part of the software in the disk, and when he/she wants to view other part of the software, he/she can replay it by being informed of the password for this part by telephone at Step 951u, and entering the password at Step 951k. A rental video store has been shown as an example. When a piece of enciphered software for a personal computer is sold at a personal computer software store, the password may be printed by a POS terminal and handed to the buyer.

Figure 14:
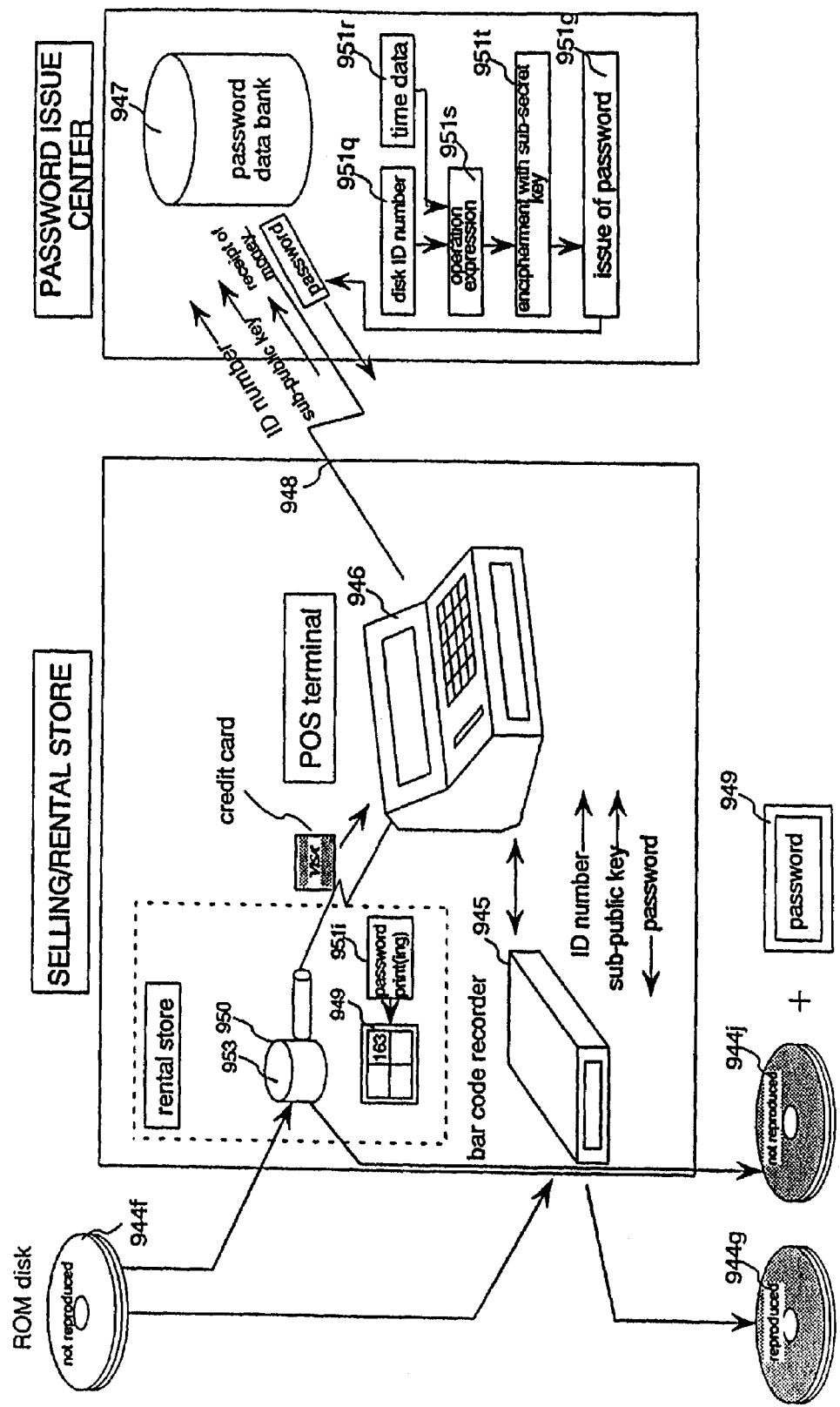
FIG. 14 is a block diagram of a POS settlement system with a ROM disk having a BCA and a POS terminal according to an embodiment of the invention.
Figure 15:
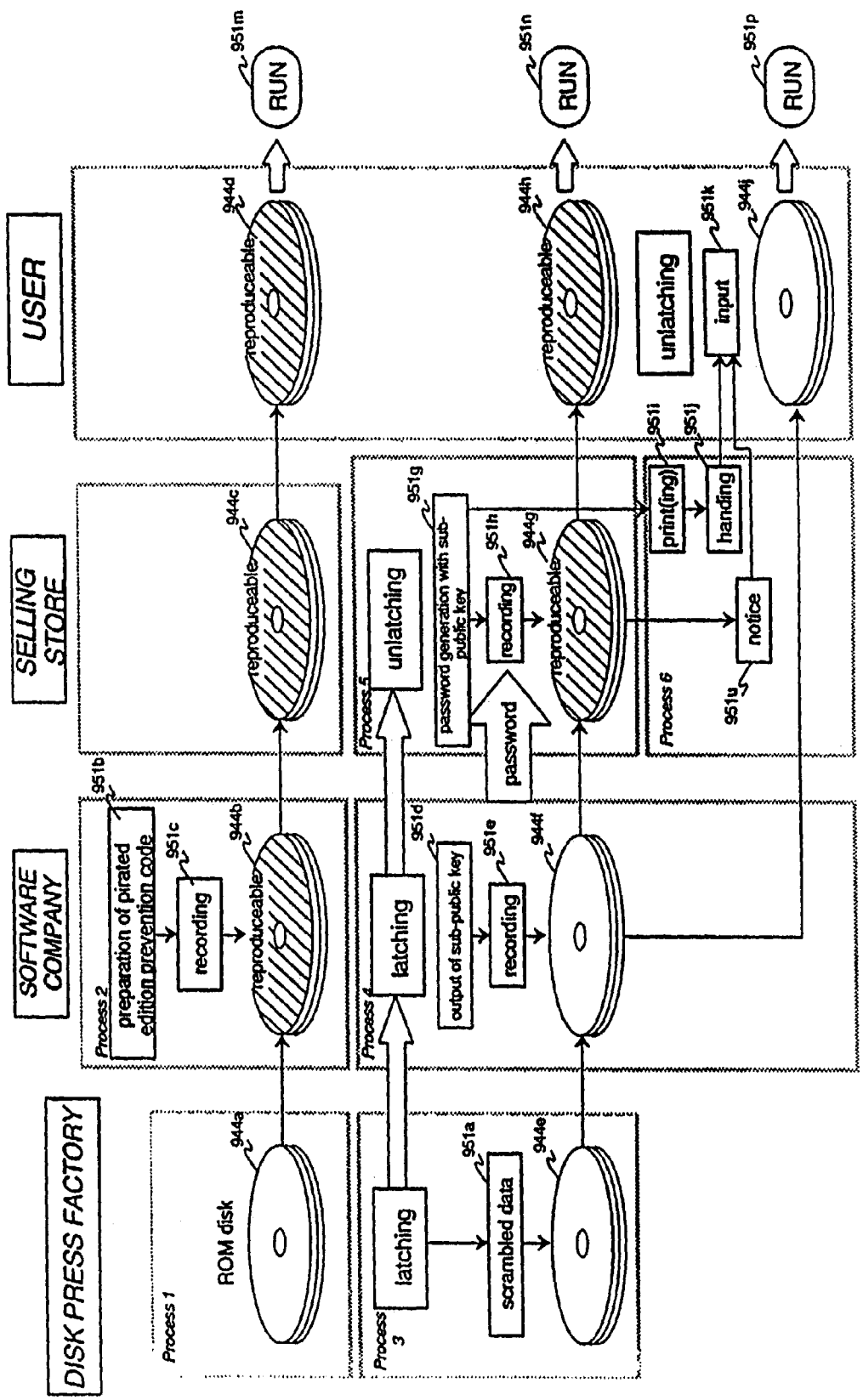
FIG. 15 is a flow chart of cipher release in and between a press company, a software company and a selling store, according to an embodiment of the present invention.

The operations of Processes 5 and 6 in FIG. 15 at a selling or rental store will be explained in more detail with reference to FIG. 14. A selling store receives an enciphered and/or scrambled disk 944f from the software maker. After the store confirms its receipt of money from a user, it sends from its bar code recorder 945 the ID number of the disk 944f and the data on the sub-public key via its POS terminal 946 to the password issue center 952. For a small-scale system, the password issue center, that is, the system including the sub-secret key of the sub-public key may exist in the POS terminal. The password issue center inputs the disk ID number and the time data at Step 951q, computes them at Step 951s, enciphers them with the sub-secret key at Step 951t, issues a password at Step 951g, and sends it through the network 948 and POS terminal 846 to the BCA bar code recorder 945. Then the recorded disk 944g is handed to the customer. The disk 944g can be replayed as it is.

For rental stores and personal computer software stores, ROM disks 944f the ciphers and/or scrambles of which have not been released are displayed in stores. If a customer designates a particular ROM disk 944f, the bar code of the reflection layer by the non-reflection part 915 of the disk 944f is read, so that the disk ID number is read, by a person holding a circular bar code reader 950 with an integrated rotary optical head 953 for spirally scanning, and pressing it on the center of disk 900 in a transparent case. By printing the commodity bar code of the disk ID as shown at 852 in FIG. 13, it is possible to read the code with an ordinary POS terminal bar code reader. Alternatively, the pressed circular bar code recorded in advance on the original disk may be read. These data including the disk ID are processed by the POS terminal 946. The charge is settled by credit card. The password issue center issues, at Step 951g, a password associated with the ID number as stated above. For rental use, a password is made by enciphering the disk ID number with date data added as used at Step 951r in order to limit the number of days for which the disk can be replayed. For this password, the disk can operate on only particular days. It is therefore possible to set a rental period, which may be three days, for instance, in the password.

The thus issued password for descrambling is printed at Step 951i together with the date of rent, the date of return and the rental title charge on the receipt 949, and handed with the disk to the customer. The customer takes the disk 944j and receipt 949 home. At step 951k, the customer enters the password with the ten-key input part 954 of the first computer 909 in FIG. 6, so that the password 835 is computed with the ID number 835a and input into the cipher decoder 837. Then, the password is converted into plaintext by means of the decoding key. Only if the password is correct, will the cipher decoder 837 descramble the program data and supply image output.

In this case, if the password includes time data, the data is checked with the date data of the clock part 836*b*. The password is descrambled for the coincident dates. The inputted password is stored together with the associated ID number in the nonvolatile memory 755*a* of the memory 755. Once the user enters the password, it is descrambled without being entered again. It is thus possible to lock and unlock the disk electronically in distribution.

Figure 16:
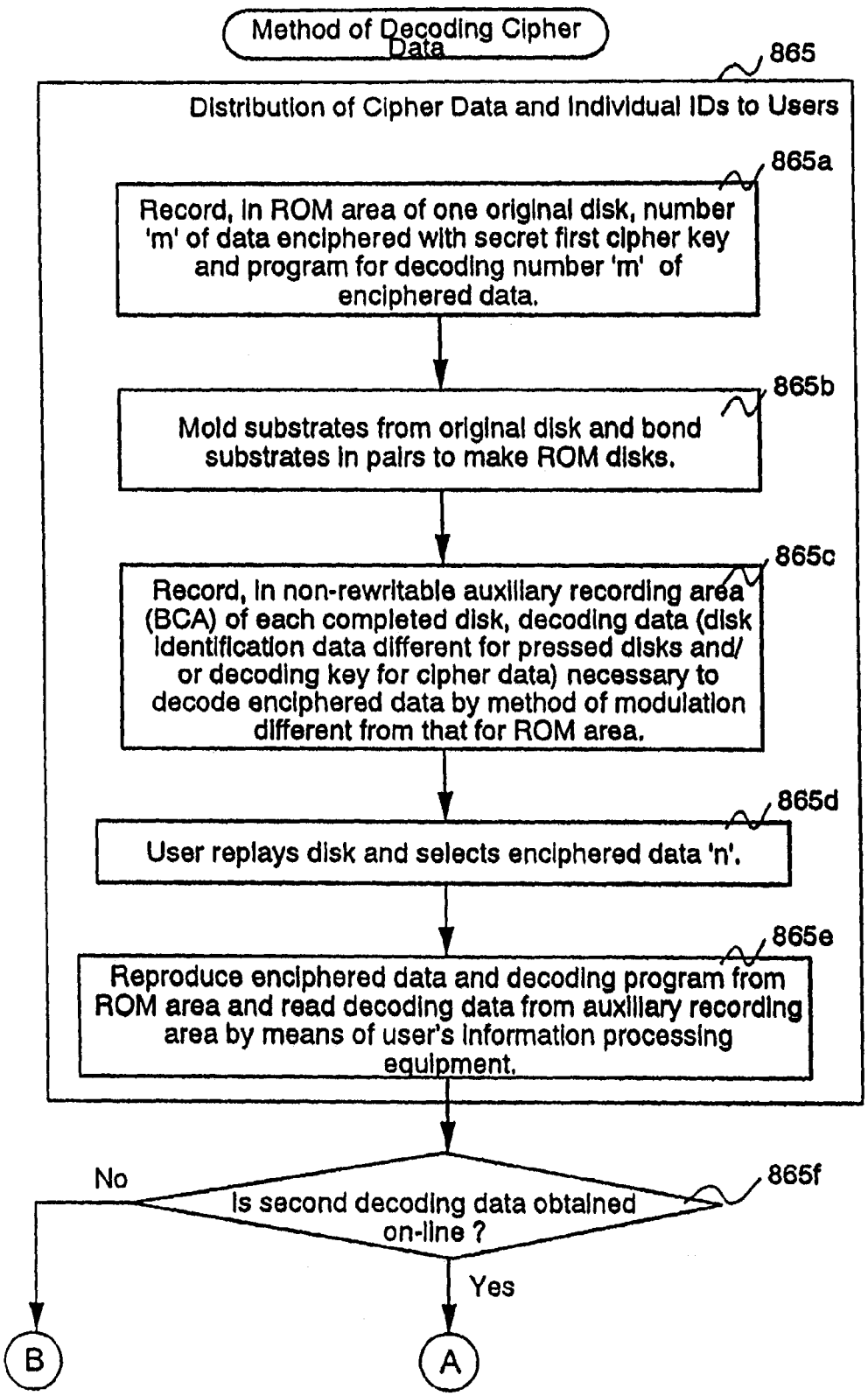
FIGS. 16 and 17 are flow charts (Parts 1 and 2, respectively) of steps of enciphering and decoding cipher data with a disk ID and/or the like according to an embodiment of the invention.
Figure 17:
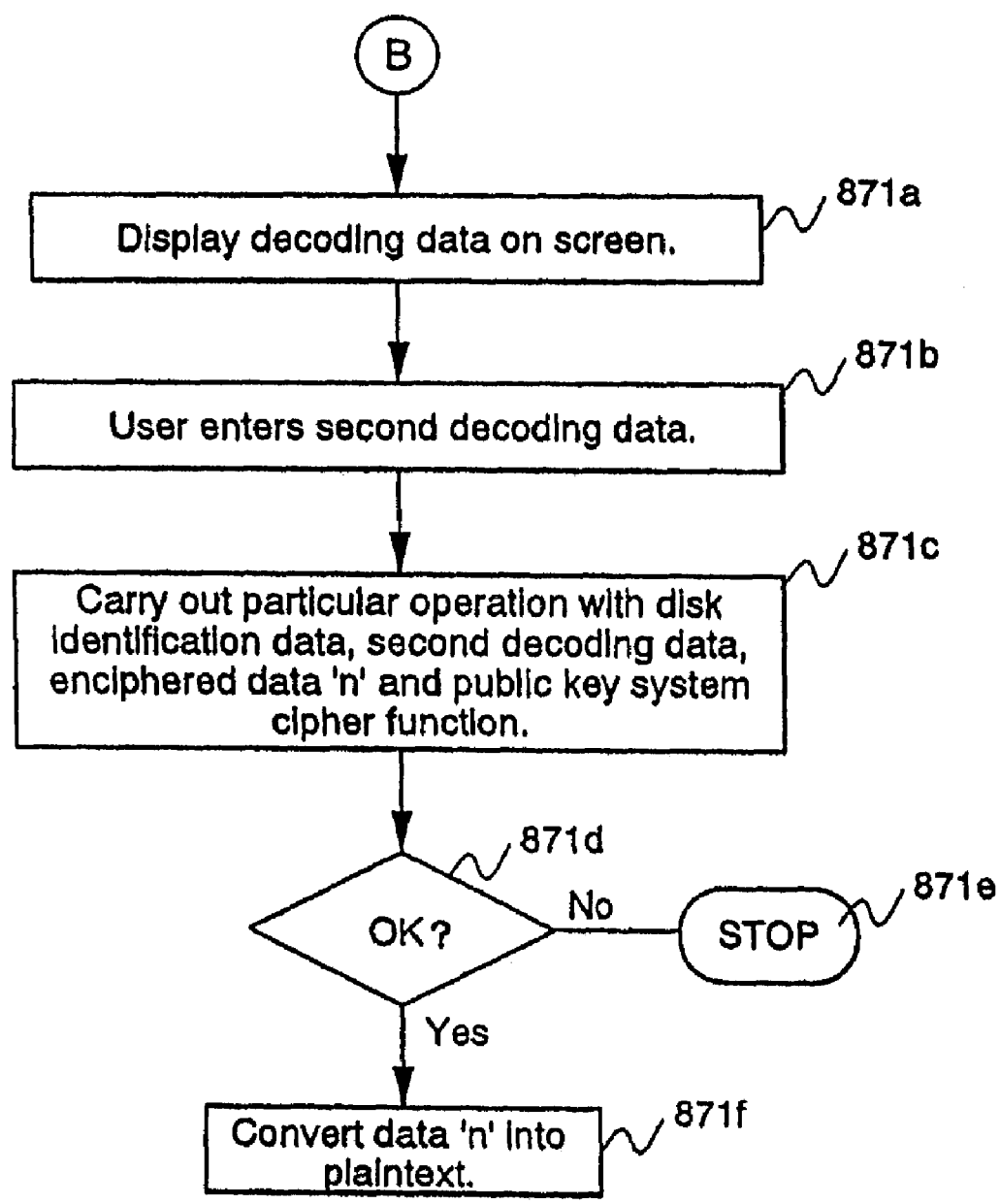

With reference to FIG. 16, the method of decoding the software of a disk which has been recorded as cipher data will be explained in detail.

Step (Process) 865 represents the overall flow of distribution of cipher data and individual IDs to users. First, at Step 865*a*, a number 'm' of data enciphered with the secret first cipher key and a program for decoding the enciphered data are recorded in the RON area of an original disk. At Step 865*b*, substrates are molded from the original disk, and then the substrates with reflection films added thereto are laminated in pairs to make completed RON disks. At Step 865*c*, the decoding data (the disk identification data different for the pressed disks, respectively, and/or the decoding key for the cipher data) necessary to decode the enciphered data is recorded in the auxiliary recording area (called BCA), which cannot be rewritten, of each completed disk by a method of modulation different from that for the ROM area. At Step 865*d*, a user replays the distributed disk, selects a desired enciphered data 'n', and starts the decoding process. At Step 865*e*, the user's first computer reproduces the enciphered data and the decoding program from the ROM area, and reads the decoding data from the auxiliary recording area (BCA). If, at Step 865*f*, the second decoding data is not obtained on-line, then, at Step 871*a* of FIG. 17, the ID and/or other auxiliary decoding data are displayed on the screen. At Step 871*b*, the user obtains the second decoding data such as the password associated with the ID, and enters it into the first computer. Carried out at Step 871*c* is a particular operation of an open-key cipher function with the disk identification data, the second decoding data, and the enciphered data 'n' If, at Step 871*d*, the result is correct, then, at Step 871*f*, the '1-n'th data is translated into plaintext, so that the user can make the software of the data 'n' operate.

Figure 18:
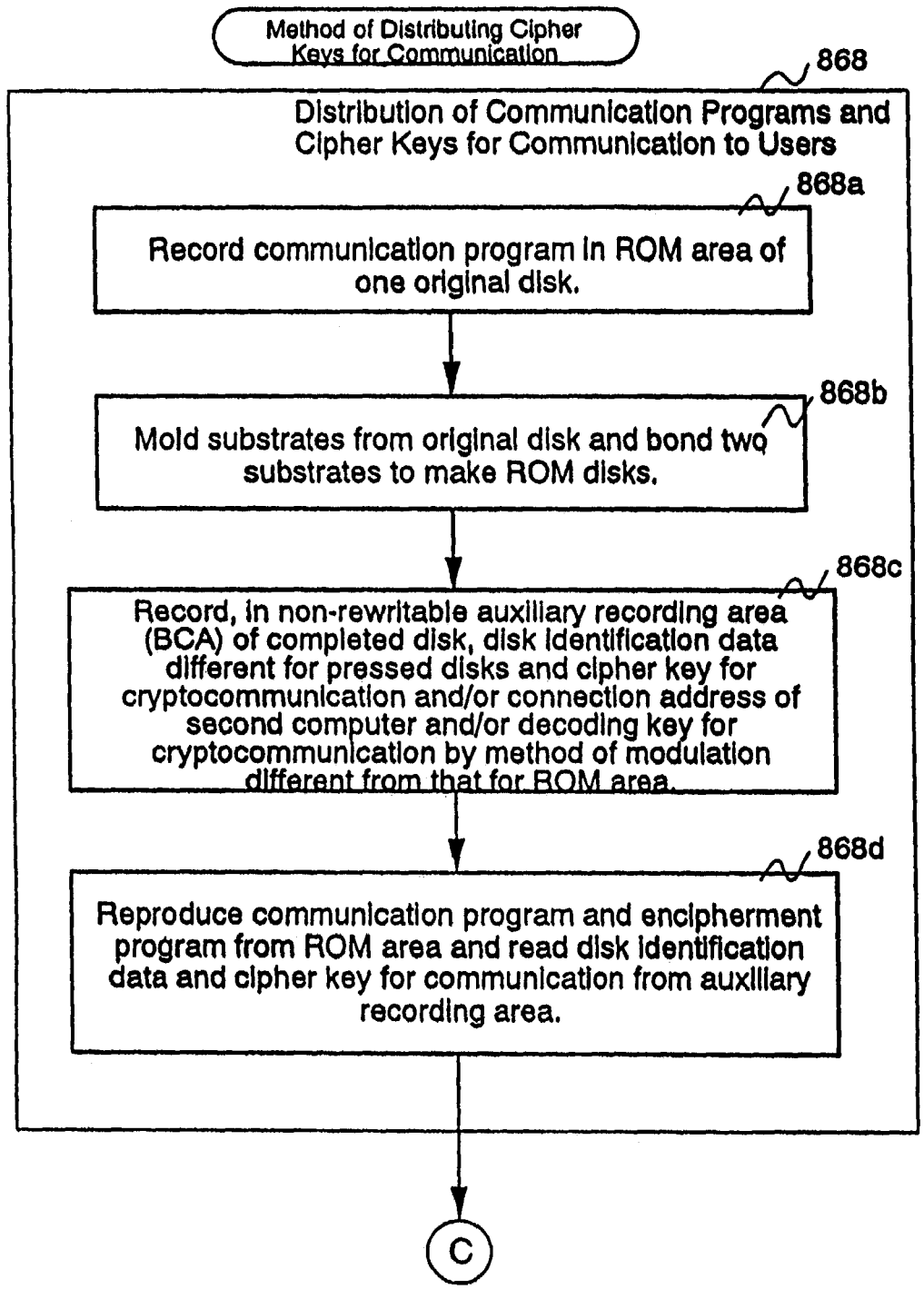
FIGS. 18, 19 and 20 are flow charts (Parts 1, 2 and 3, respectively) of communication cipher key distribution and cryptocommunication with a BCA according to an embodiment of the invention.

Next, with reference to the flowchart of FIG. 18, the method of cryptocommunication essential to the Internet and/or the like using a BCA will be described. Step (Process) 868 is the routine of the method of distributing the communication program and cipher key for communication to users. First, at Step 868*a*, at least the communication program and/or connection data are recorded in the ROM area of an original disk. At Step 868*b*, substrates are molded from the original disk, and the substrates are laminated in pairs to make completed ROM disks. At Step 868*c*, the disk identification data different for the pressed disks, respectively, and the cipher key for cryptocommunication are recorded in the non-rewritable auxiliary recording area (BCA) of each completed disk. According to circumstances, the connection address of the second computer and/or the decoding key for cryptocommunication is recorded by a method of modulation different from that for the ROM area. At Step 868*d*, the user's first computer reproduces the communication program and the decoding program from the ROM area, and reads the disk identification data and the cipher key for communication from the auxiliary recording area. The process continues at FIG. 19. At Step 867*a*, it is judged if there is a connection address in the BCA area. If yes, the second computer is accessed, at Step 867*b*, on the basis of the connection address such as the BCA area URL. If there is no connection address, the computer of the connection address in the ROM area is accessed at Step 867*c*. At Step 867*d*, the transmit data is input. At Step 867*e*, it is judged if there is a cipher key for cryptocommunication in the BCA area. If so, the transmit data is enciphered, at step 867*g*, with the cipher key for cryptocommunication in the BCA area to make a third cipher. If not, the data is enciphered, at step 867*f*, with the cipher key for cryptocommunication in the ROM area or. HDD to make a third cipher.

Figure 20:
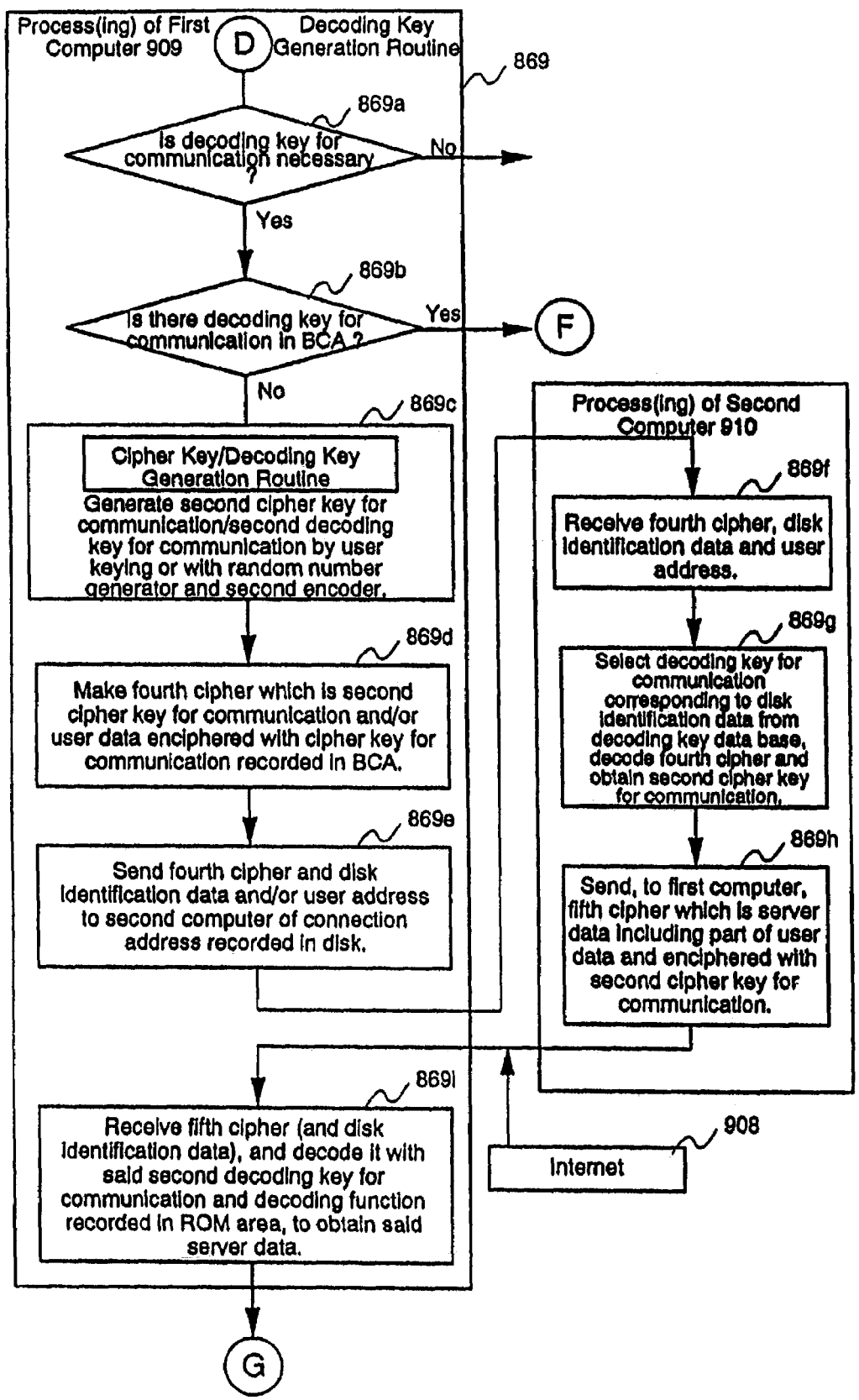

In FIG. 20, Step (Process) 869 represents the routine of generating a decoding key for the cipher received from the second computer 910. First, at Step 869*a*, the first computer judges if a decoding key for communication is necessary. If necessary, the process goes to Step 869*b*, where a check is made to judge if there is a decoding key for communication in the BCA. If there is no decoding key, the process goes to Step 869*c*, where a pair of second cipher key for communication and second decoding key for communication is generated newly with the program for generating the cipher key/decoding key reproduced from the ROM area, by the user keying or with data from a random number generator and the second encoder reproduced from the ROM area. At Step 869*d*, a fourth cipher is made which is the second cipher key for communication and/or the user data enciphered with the cipher key for communication recorded in the BCA and the encipherment software reproduced from the ROM area. At Step 869*e*, the fourth cipher and the disk identification data and/or the user address are sent to the second computer of the connection address reproduced from the disk. The process of the second computer includes Step 869*f*, where the fourth cipher, the disk identification data and the user address are received. At Step 869*g*, the decoding key for communication paired with the disk identification data is selected from the decoding key data base, and the fourth cipher is decoded with the selected key to obtain the plaintext of the second cipher key for communication. At Step 869*h*, the fifth cipher which is the server data including part of the user data and enciphered with the second cipher key for communication is sent through the Internet 908 to the first computer. At Step 869*i*, the fifth cipher (and disk identification data) is (are) received, and decoded with the second decoding key for communication and the decoding function recorded in the ROM area to obtain the plaintext of the server data. In this way, the method of Step 869 in FIG. 20 realizes two-way cryptocommunication between the first and second computers.

Figure 21:
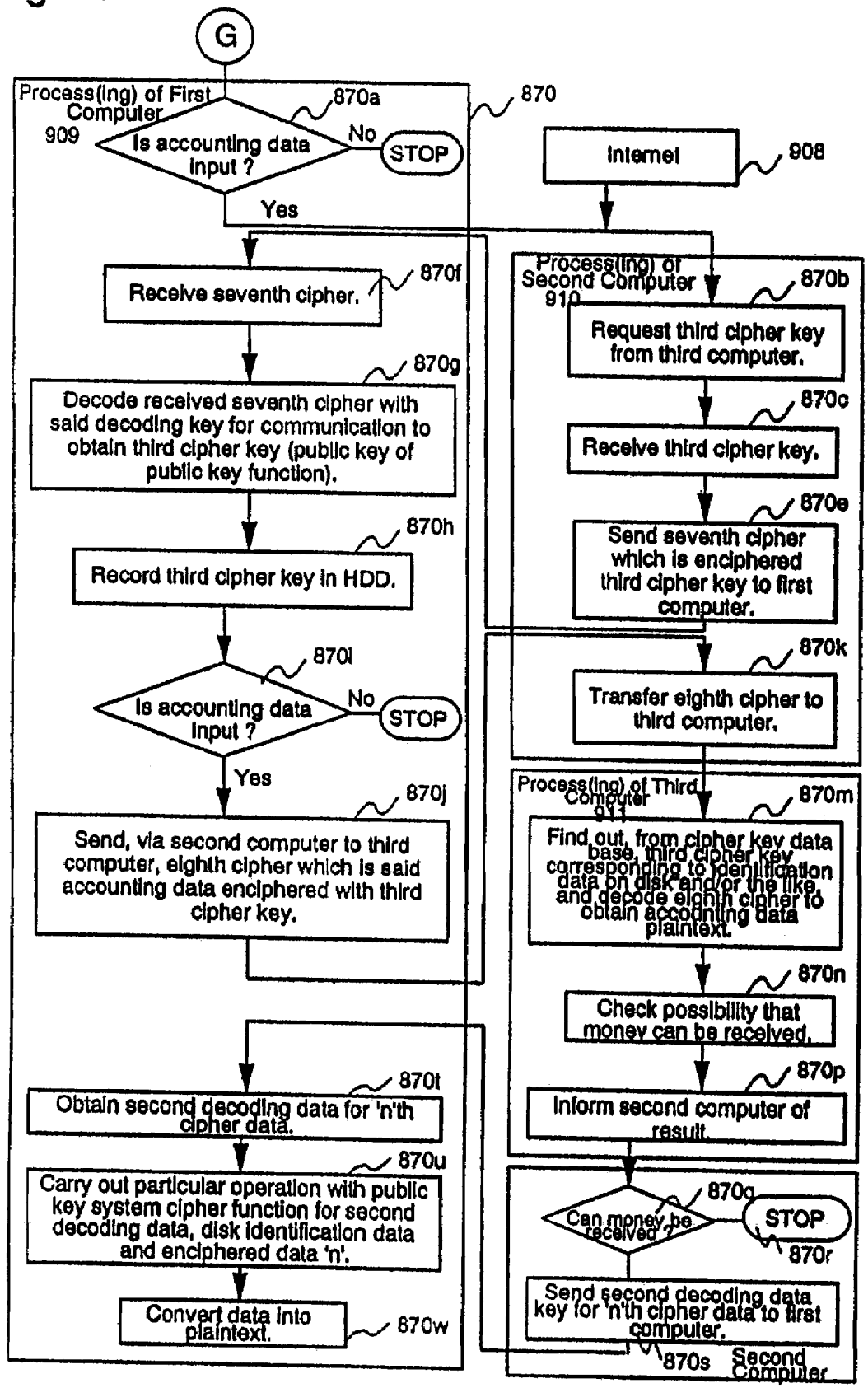
FIGS. 21, 22 and 23 are flow charts (Parts 1, 2 and 3, respectively) of an electronic settlement system with a BCA according to an embodiment of the present invention.

In FIG. 21, Step (Process) 870 represents the routine of receiving accounting data. If, at Step 870*a*, the accounting data is input, the third cipher key of the public key cipher for accounting communication is requested from the second computer. At Step 870*b*, the second computer requests the third cipher key from the third computer. The third computer 911 sends the ID and third cipher key to the second computer, though the exchange step is omitted. At Step 870*c*, the second computer receives the ID and third cipher key. At Step 870*e*, the seventh cipher which is the third cipher key enciphered with the second cipher key for communication and/or the like is sent to the first computer. The first computer receives the seventh cipher at Step 870*f*. At Step 870*g*, the received seventh cipher is decoded with the second decoding key for communication so as to obtain the third cipher key (public key of public key function). At Step 870*h*, the third cipher key is recorded on the HDD according to circumstances. This is used for the next transmission. At Step 870*i*, it is judged if a credit card number, a password for settlement and/or other secret accounting data are input. At Step 870*j*, the eighth cipher which is the accounting data enciphered with the third cipher key is sent via the second computer to the third computer. At Step 870*k*, the second computer receives the eighth cipher and transfers it again to the third computer. Only the third computer 912, which is, for example, at a banking institution, has the decoding key for the third cipher, so that the second computer, which is an electronic store, cannot decode it. At Step 870*m*, the third computer determines from the cipher key data base the third decoding key associated with the third cipher key by using identification data on the disk and/or the like, and decodes the eighth cipher with the third decoding key, which is the secret key of the public key cipher, so as to obtain the plaintext of the accounting data. At Step 870*n*, a check is made to judge from the user's credit data, deposit remains and/or other banking data whether the money can be received. At Step 870*p*, the third computer informs the second computer of the result of the search. The second computer, which is an electronic store, judges at Step 870*q* if the money can be received. If not, the process goes to Step 870*r*, where the article and/or the key for decoding the cipher software is not sent. If the money can be received, for a key provision system as shown in FIG. 16, the process goes to Step 870*s*, where the cipher software decoding key, that is, the article is sent via Internet 908 to the user's second computer. At Step 870*t*, the first computer receives the cipher software decoding key. At Step 870*u*, the cipher of the '1-n'th enciphered software is released. At Step 870*w*, the plaintext of the software is obtained. In this way, a content key provision system is realized.

Figure 19:
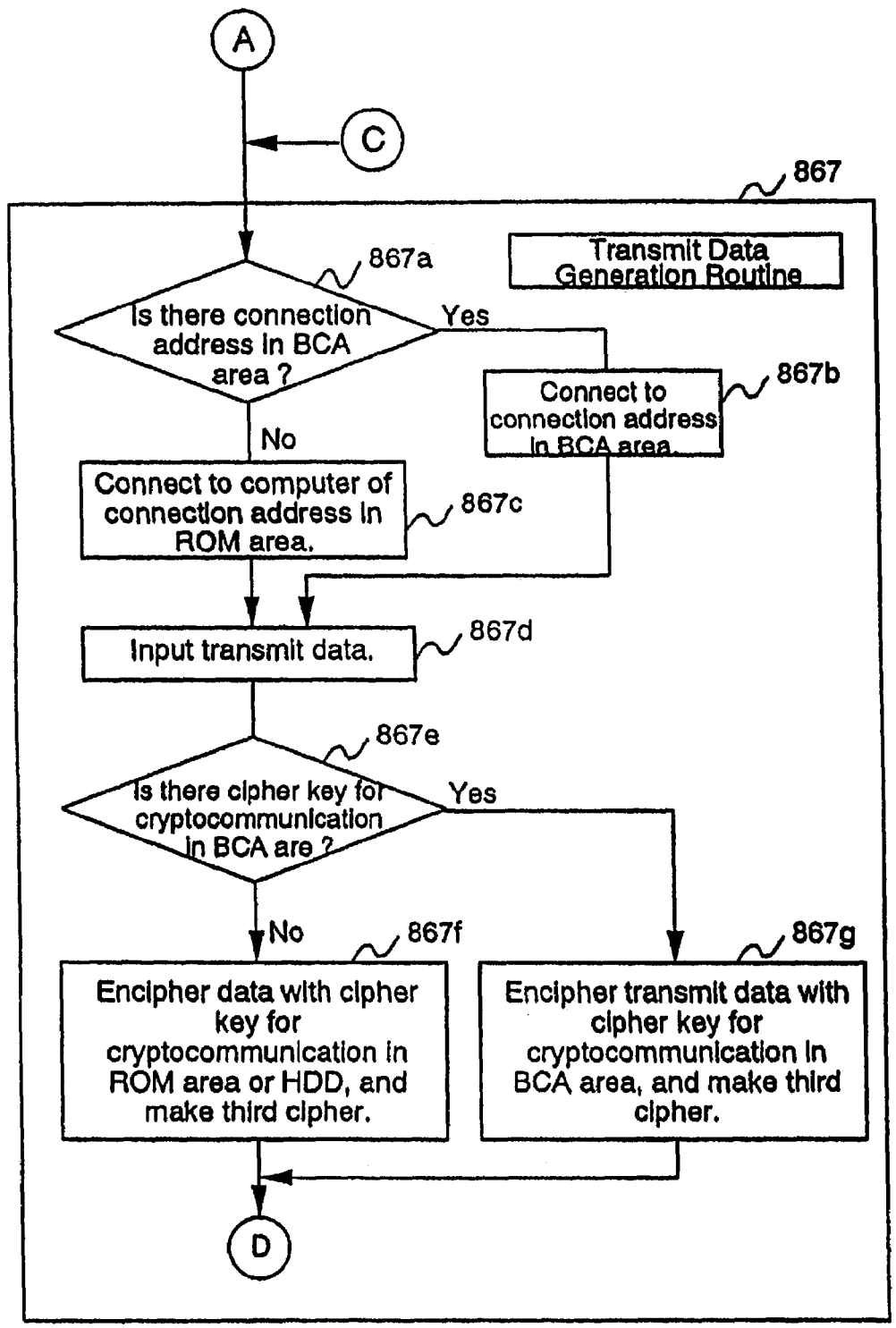

The method of Step 870 in FIG. 21 requests the third computer, that is, a banking institution to issue according to the need a public key for the third cipher key, which needs high security for accounting data. It is not necessary to record the public key in the BCA in advance. It is therefore possible to use for the third cipher key a stronger RSA system cipher key of 256 bytes of RSA2048 without consuming the BCA capacity. Further, because there is no need for recording in the BCAs of all disks in advance, the total of the issued third cipher keys decreases, and the computer CPU time taken to compute the third cipher keys decreases. In addition, because the third ciphers do not exist in the BCAs, they are not opened, so that the security is improved. In this case, the role of the BCA is, as shown in FIGS. 19 and 20, to record the identification data of a secret communication disk by means of the cipher key of the RSA1024 grade. Only one BCA disk realizes cryptocommunication with the second computer, so that the effect is high.

Figure 22:
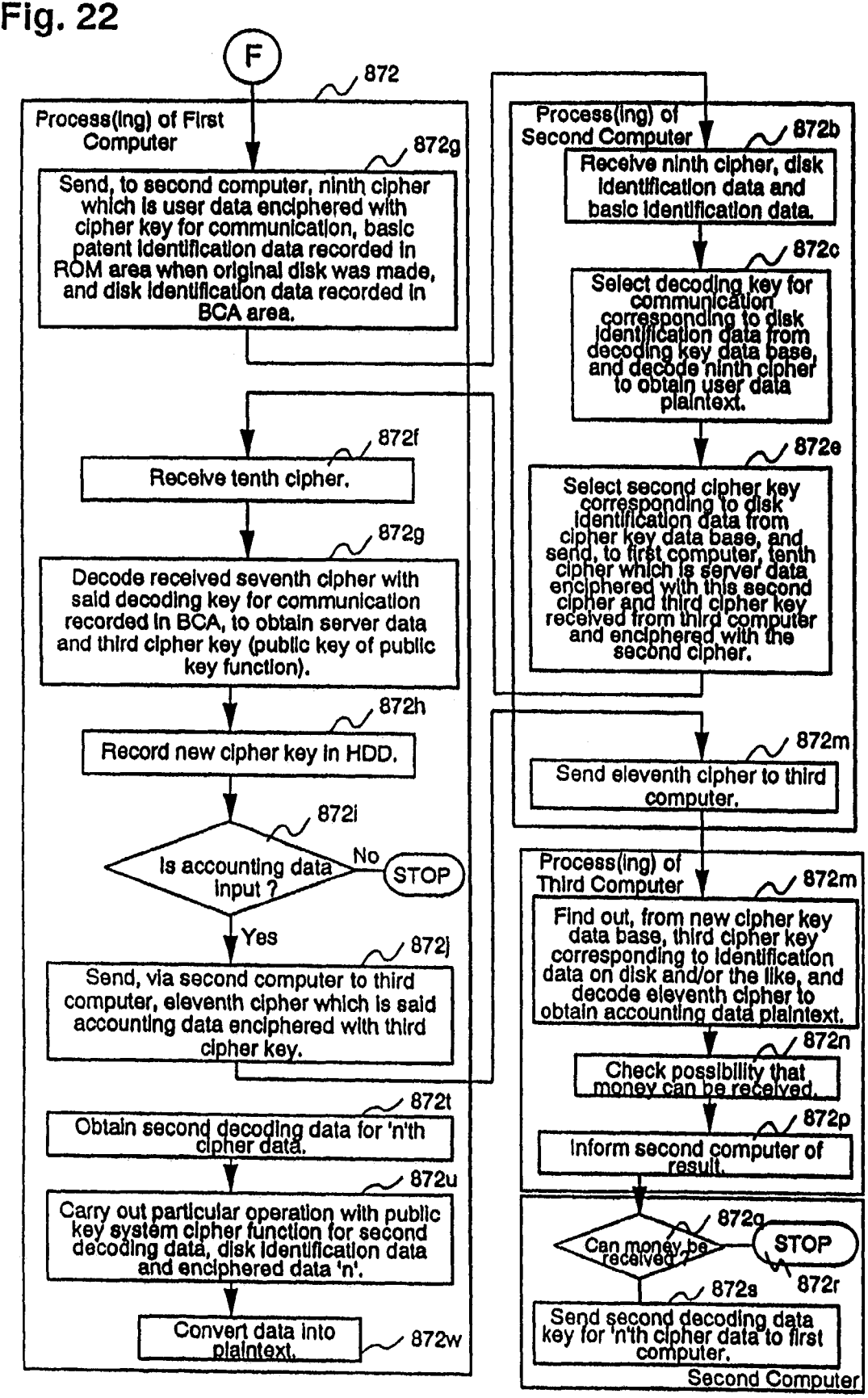

With reference to FIG. 22, Step (Process) 872 of cryptocommunication in a case where the cipher key and the decoding key both for communication have been recorded in the BCA will be described. At Step 872*g*, the first computer 909 sends to the second computer 910 the ninth cipher which is the user data enciphered with the cipher key for communication reproduced from the BCA, the basic identification data recorded in the ROM area when the original disk was made, and the disk identification data recorded in the BCA area. At Step 872*b*, the second computer receives the ninth cipher, the disk identification data and the basic identification data. At Step 872*c*, the decoding key for communication paired with the disk identification data from the decoding key data base is retrieved, and the ninth cipher is decoded to obtain the plaintext of the user data. At Step 872*e*, the second cipher key associated with the disk identification data is selected from the cipher key data base. In addition, the second computer sends to the first computer the tenth cipher which is the server data enciphered with this second cipher and the third cipher key received from the third computer by the procedure described in FIG. 21 and enciphered with the second cipher. The first computer receives the tenth cipher at Step 872*f*. At Step 872*g*, the received seventh cipher is decoded with the second decoding key for communication recorded in the BCA, to obtain the plaintext of the server data and the third cipher key (public key of the public key function). At Step 872*h*, according to the need, the third cipher key is recorded on the HDD. At Step 872*i*, it is judged if the accounting data is input. If so, the process goes to Step 872*j*, where the eleventh cipher which is the accounting data enciphered with the third cipher key is sent via the second computer to the third computer. At Step 872*m*, the second computer sends the eleventh cipher again to the third computer. At Step 872*m*, the third computer determines from the third cipher key data base, the third cipher key paired with the identification data on the disk and/or the like, and decodes the eleventh cipher to obtain the plaintext of the accounting data. At Step 872*n*, the possibility that the money can be received from the user is checked. At Step 872*p*, the result of the search is sent to the second computer. At Step 872*q*, the second computer checks to judge if the money can be received from the user. If so, for a key provision system as shown in FIG. 16, the process goes to Step 872*s*, where the cipher software decoding key, that is, an article is sent via the Internet to the user's second computer. At Step 872*t*, the first computer receives the cipher software decoding key. At Step 872*u*, the cipher of the '1-n'th enciphered software is released. At Step 872*w*, the plaintext of the software is obtained. In this way, a content key provision system is realized.

Figure 7:
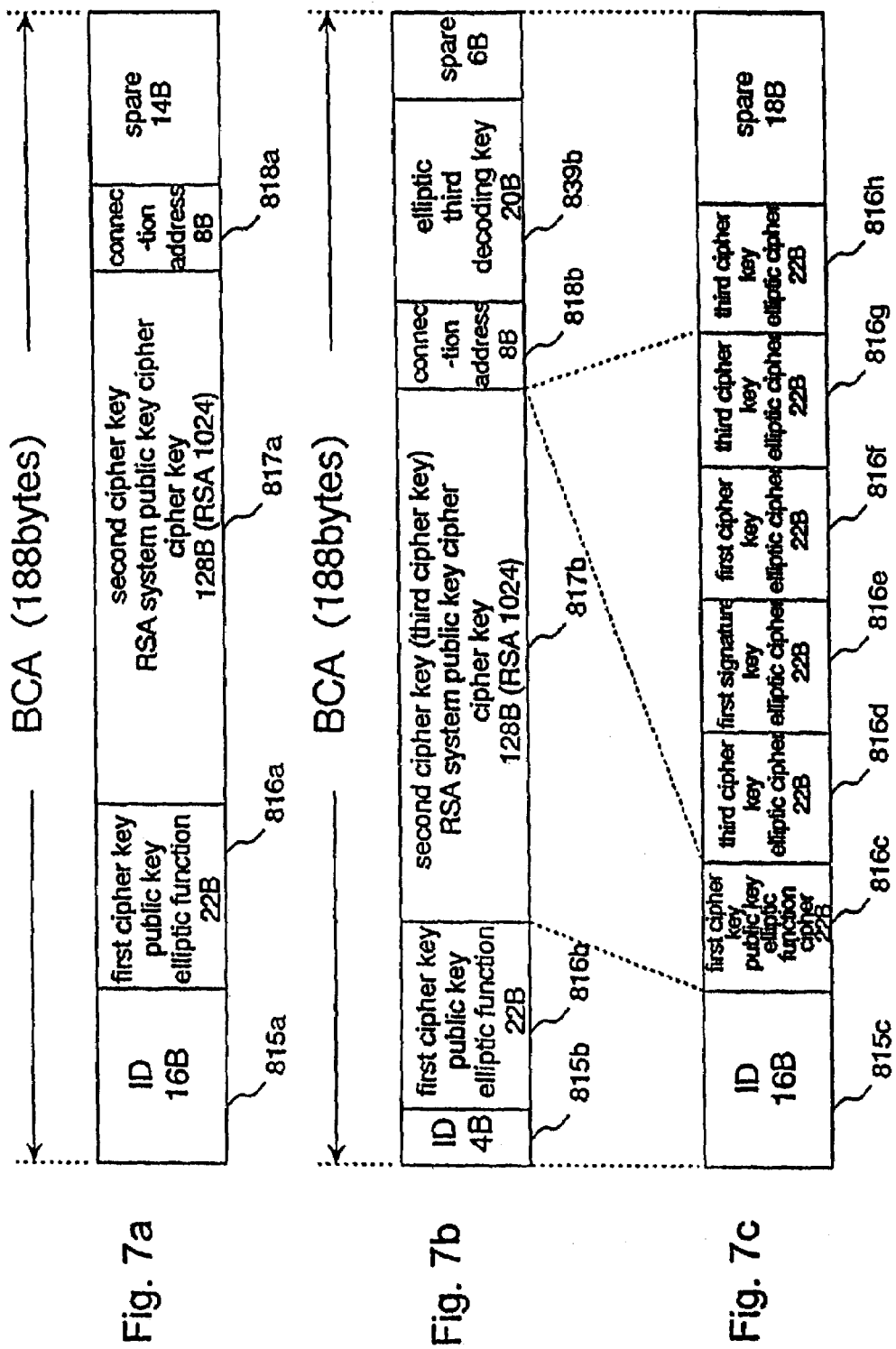
FIGS. 7a–c show the format of a BCA according to the invention.

The merit of the effect of the method of Step 872 in FIG. 22 is that, because both the cipher key and the decoding key are recorded in the BCA area, it is not necessary to transmit the decoding key and/or the cipher key necessary for reception from the second computer. The maximum BCA capacity is 188 bytes. A public key and/or another cipher function needs only 128 bytes, and can therefore be recorded. Further, it is possible to bidirectionally encipher the grade in RSA512. Because seven or eight elliptic functions can, as shown in FIG. 7, be stored, elliptic functions are more effective.

Figure 23:
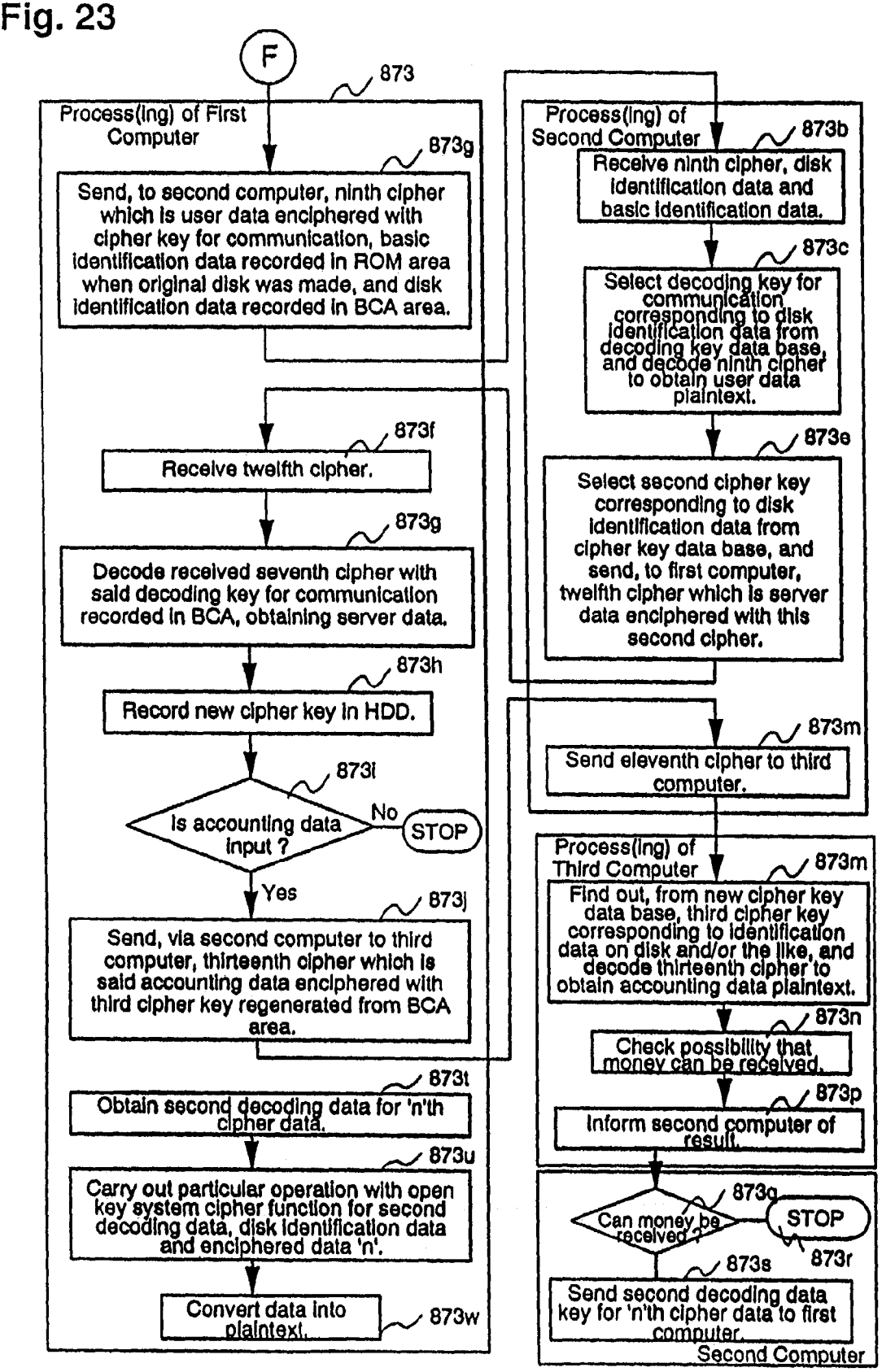

With reference to FIG. 23, the operation and effect in a case where the first and third cipher keys have been recorded in the BCA in advance will be explained. Because Steps 872*a* through 872*w* in FIG. 22 are nearly identical with Steps 873*a* through 873*w* in FIG. 23, only the different steps will be explained.

The third cipher key for protecting the security for accounting data and/or other banking data has been recorded in the BCA. Therefore, at Step 873*e*, the second and third computers do not need to generate and send the third cipher key. At Steps 873*e*, 873*f* and 873*g*, the twelfth cipher is sent and received. At Step 873*j*, the third cipher key is read from the BCA area, and the user's accounting data is sent via the second computer to the third computer. The method of FIG. 23 does not need the third cipher key generated, sent and received at all, so that the procedure is simple.

In the case of electronic settlement systems, in general, there are a plurality of accounting centers representative of credit companies. Therefore, naturally, there is a need for a plurality of third cipher keys, which are public keys. As explained with reference to FIG. 7*b*, there is a need for an RSA1024 grade or more, that is, 128 bytes or more if an RSA cipher function is used. The third cipher key 817*b* can therefore enter only one place of 188 bytes of the BCA. However, elliptic-function cipher keys (elliptic ciphers) which have appeared in recent years give, with small capacity, security equivalent to that of RSA. In recent years, RSA function R8A1024 has been the lowest standard of banking data security. While an RSA function needs 128 bytes, it is said that an elliptic cipher needs only about 20 through 22 bytes for equivalent security. Therefore, as shown in FIG. 7c, it is possible to store in the BCA seven, eight or fewer third ciphers which deal with banking data. The use of elliptic functions realizes a SCA-application electronic settlement system which can deal with a plurality of essential banking centers. Explanation has been made, concentrated on the third cipher, but even if an elliptic cipher is used for the public key for the first cipher key, its effect is similar because high security is kept in relation to a plurality of electronic stores.

With reference to FIG. 24, the RAM disk recorder/reproducer with a BCA explained with reference to FIG. 10 will be described in more detail. As an embodiment, the procedure for recording in a RAM disk in a so-called pay-per-view system will be described. First, with its program transmitter 883, a CATV company or another software company enciphers movie software or other contents 880 by using the first cipher key 882 in the first encoder to generate a first cipher 900, and sends this cipher to a decoder 886 such as each user's CATV decoder. If the decoder 886 sends a request for a particular program through a network to a key issue center 884, the center sends the first decoding data 885a to the first decoding part 887 of the first decoder 886. The first decoding data 885a is a particular piece of software such as the scramble release key for the particular decoder system ID number and particular timing data 903, and includes a recording permission card 901 for a RAM disk. The first decoding part 887 decodes the first cipher 900 with the system ID 888 and first decoding data 885a. In the case of a picture signal, the signal descrambled once and scrambled further with another cipher to protect the signal from being copied is output from the third cipher output part 889. The picture can be viewed and listened to on a general TV 899, though the original signal is guarded from being copied. If the recording permission code 901a is NO, it is not possible to record in a RAM disk 894. If OK, however, it is possible to record in only one RAM disk 894. This method will be explained.

In the decoder 886, an IC card 902 is inserted, and the BCA reproduction part 895 reads the BCA of the RAM disk 894 in a RAM recorder. Then the disk ID 905 is sent to the IC card 902. The IC card 902 checks the recording permission code 901a and the present time data 904 obtained from the disk IC 905 and the decoder 886, and makes a two-way hand-shake type copy check 907 with the third cipher output part 889. If the recording permission code and copy checks are OK, the second auxiliary encoder 891 in the IC card 902 issues a second cipher key 906. The second encoder 890 enciphers the third cipher again to generate a second cipher, which is the contents 880 enciphered with the disk ID of a particular disk. The second cipher is sent to the RAM recorder 892, where it is 8–15 or 8–16 modulated by the first modulation part in the recording means 893. The second cipher 912 is recorded in the first recording area 894a of the RAM disk 894 by means of a laser. In this way, the data of the RAM disk 894 is enciphered with the particular disk ID number.

When the reproduction signals in this disk are 8–16 demodulated by the first modulation 896a using a normal reproduction means 896, the second cipher of the contents is output. The second decoder 897 has second decoding keys 898a, 898b and 898c, which correspond to the cipher keys of the IC cards different for CATV stations or other program supply companies, respectively. In this case, the decoding key identification data of the decoder 868 or IC card 886 has been recorded in the first recording area 894a. The reproducer reads the decoding key identification data 913 from the first recording area 894a. The decoding key selection means 914 automatically selects out of the decoding keys 898a through 898z the second decoding key 898a corresponding to each cipher key. With the disk ID 905a as a key, the second decoder 897 decodes the second cipher. An IC card having a particular decoding key might be used. In the case of an image, it is possible to obtain a normal image descrambled at a TV 899a.

In the system of FIG. 24, a disk ID 905 is sent to the IC card inserted into the decoder in each user's home to encipher picture image data and/or the like. It is therefore not necessary for the software company 883 to individually change the cipher of the contents for distribution to users. Consequently, when broadcasting scrambled pay-per-view images to a great number of viewers as is the case with satellite broadcasting and CATV, it is possible to permit recording in only one RAM disk per user.

If, at the same time when recording is made in a disk in the system of FIG. 24, an attempt is made to illegally copy, that is, record in a second disk, that is, a RAM disk of another disk ID, it is not possible to alter the disk ID because two-layer disks are used for BCAs. Therefore, unauthorized copying in the second disk at the same time is prevented. It can be considered that during another time period, a simulated or dummy recording permission code 901a and/or a third cipher is sent to the decoder and/or IC card and data is recorded in a RAM disk of another disk ID. Even against such unauthorized practice, the decoder time data control part 902 in the IC card compares the time of the timing data 903 of the key issue center 884 and/or the time of the time data of the contents and the present time of the time data part 904a in the decoder to judge if they coincide. If so (OK), the IC card 902 permits the encipherment of the second cipher computing unit 990.

In this case, a hand-shake type time check method might be used which makes the second encoder 890 and first decoder 887 exchange check data bidirectionally.

In the case of the hand-shake type, the second cipher computing unit 890 including the IC card, the first decoding part 887, and the third cipher part 889 confirm the cipher data bidirectionally. This prevents the unauthorized copying during the other time periods outside the time when the contents are sent.

In this way, in each user's decoder 886, the software company's contents are recorded in only one RAM disk 894 for each particular disk ID. This disk can be reproduced by any RAM disk reproducer. Even in the case of recording in a RAM disk by the method of FIG. 24, the software company's copyright is protected. Althoughthe encipherment and decoding have been explained with reference to the cipher encoders and cipher decoders, respectively, in the detailed description of the drawings, the cipher algorithm and the decoding algorithm are practically used with programs in a CPU.

INDUSTRIAL APPLICABILITY

By thus recording in advance the cipher key and/or the decoding key for an ID and/or a cipher in the BCA area of an optical disk, it is possible to release the cipher of enciphered contents by a simpler procedure. In addition, the secrecy of communication is realized without a conventional procedure for registration. By storing a network check program in contents, it is possible to prevent pieces of software of the same ID on the same network being installed. Thus, there are various effects on the improvement of security.

REFERENCE NUMERALS

| | |
|---|---|
| 801: | disk with a BCA |
| 802: | fixed key |
| 803: | cipher encoder or scrambler |
| 804: | recording means |
| 805: | contents |
| 806: | ID |
| 807: | trimming unit |
| 808a: | molding machine |
| 808b: | reflecting film making machine |
| 808c: | bonding machine |
| 809: | completed disk |
| 809a: | single-sided disk |
| 809b: | single-sided disk |
| 811: | press field |
| 813: | fixed key |
| 814: | BCA area |
| 815: | disk ID |
| 816: | first cipher key (secret key) |
| 817: | second cipher key (secret key) |
| 818: | connection address |
| 819: | reproducing unit |
| 820: | BCA reproducing section |
| 821: | password issue center |
| 822: | communication section |
| 823: | network |
| 824: | cipher key DB |
| 825: | first decoding key |
| 826: | contents number |
| 827: | first cipher decoder |
| 828: | accounting center |
| 829: | second decoding key |
| 830: | accounting data |
| 831: | second cipher encoder |
| 832: | second cipher decoder |
| 833: | timing data |
| 834: | password producing section |
| 835: | password |
| 836: | personal computer |
| 837: | third decoding key |
| 838: | common key |
| 839: | third cipher key |
| 840: | third cipher encoder |
| 841: | third cipher decoder |
| 842: | main cipher encoder |
| 843: | main cipher decoder |
| 844: | main decoding key |
| 845: | first cipher decoder |
| 846: | cipher encoder |
| 847: | cipher decoder |
| 849: | BCA data |
| 850: | writing layer |
| 851: | character |
| 852: | general bar code |
| 853: | decoder |
| 860: | second cipher encoder |
| 861: | second cipher decoder |
| 862: | data reproducing section |
| 863: | ROM area |
| 864: | additional recording area |
| 865: | decoding flowchart |
| 890: | second cipher computing unit |

REFERENCE NUMERALS
-continued

| | |
|---|---|
| 894a: | first recording area |
| 908: | Internet |
| 909: | first computer |
| 910: | second computer |
| 911: | third computer |
| 912: | second cipher |
| 913: | decoding key identifying data |
| 914: | decoding key selecting means |
| 915: | first slice level |
| 916: | second slice level |
| 917: | PE-RZ modulator |
| 918: | transparent substrate |
| 919: | first recording area |
| 920: | second recording area |
| 921: | disk ID |
| 922: | BCA flag |
| 923: | CPU |
| 924: | control data |
| 925: | EFM demodulation |
| 926: | 8–15 modulation-demodulation |
| 927: | 8–16 modulation-demodulation |
| 928: | first demodulating section |
| 930: | second demodulating section |
| 931: | connection address |

What is claimed is:

1. A content recording method for recording encrypted content on a recording medium having stored therein certain information, the method comprising:
   inputting a content;
   encrypting the inputted content;
   certifying validity of the recording medium based on the certain information which is information based on an identifier of the recording medium; and
   recording the encrypted content on the recording medium after certifying validity of the recording medium.

2. The content recording method of claim 1, wherein the identifier has been recorded on the recording medium in the form of stripe patterns each stripe of which extends along a radius of the medium.

3. A content recording method comprising:
   inputting a content;
   encrypting the inputted content; and
   recording the encrypted content, wherein
   after validity of a recording medium based on a certain information is certified, the encrypted content is recorded on said recording medium, and
   the certain information is information based on an identifier of the recording medium on which the encrypted content is recorded.

4. The content recording method of claim 3, wherein the identifier has been recorded on the recording medium in the form of stripe patterns each stripe of which extends along a radius of the medium.

* * * * *